Nov. 26, 1957  D. C. LAVIERI ET AL  2,814,239
TRACER CONTROL FOR MACHINE TOOLS
Filed June 16, 1954  15 Sheets-Sheet 1
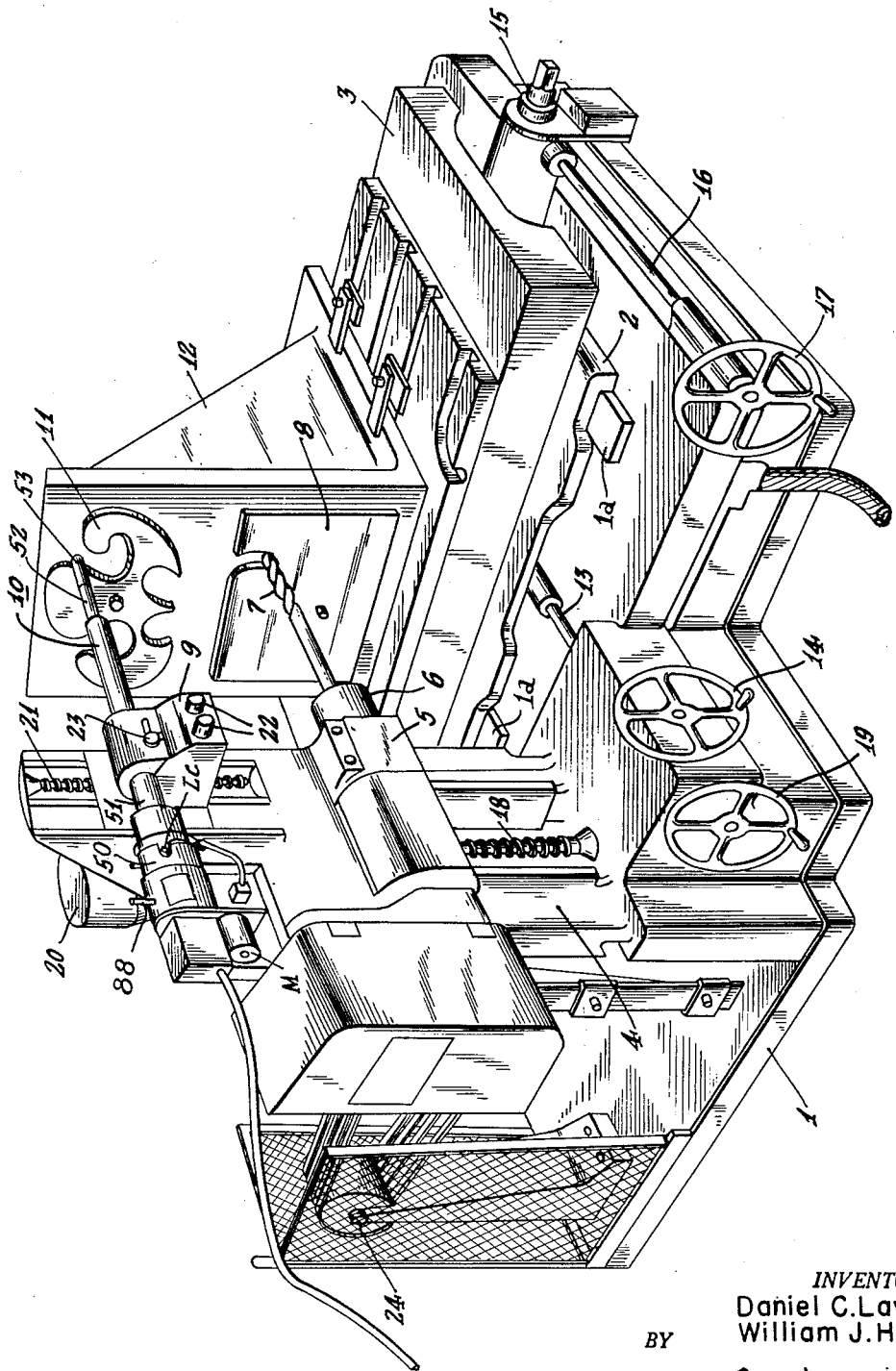
FIG. I.
INVENTORS
Daniel C. Lavieri
William J. Hawley
BY
Ray J. Ernst
ATTORNEY.

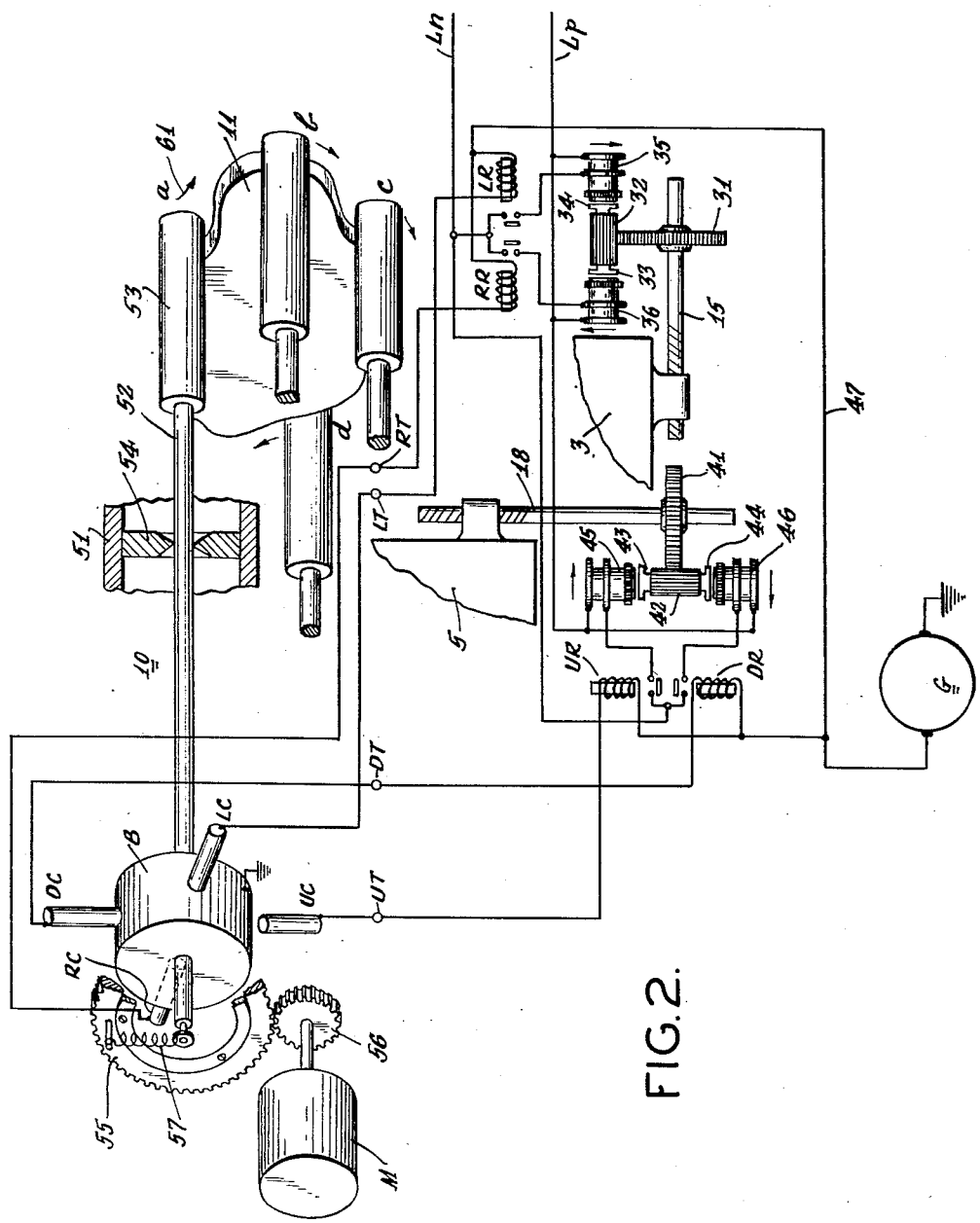

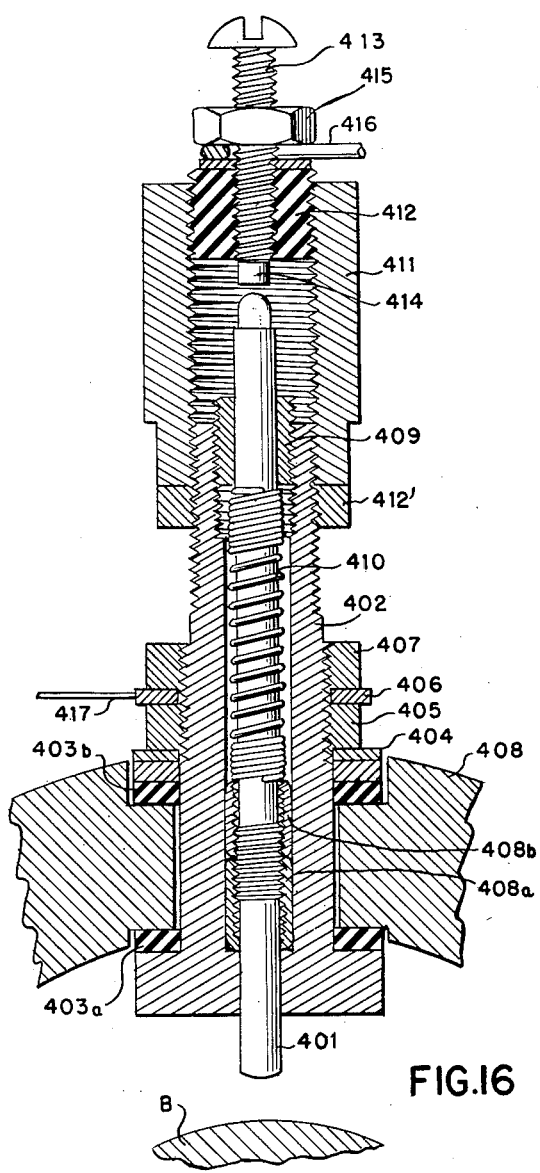
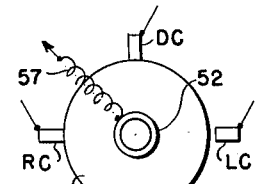
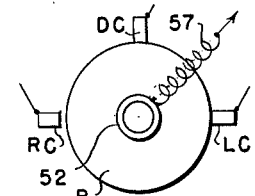
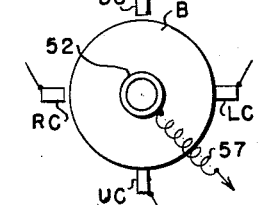
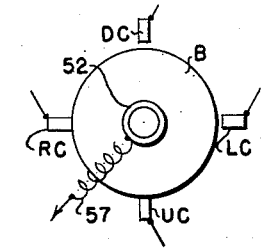
FIG.16
FIG.2a
FIG.2b
FIG.2c
FIG.2d
INVENTORS
Daniel C. Lavieri
William J. Hawley

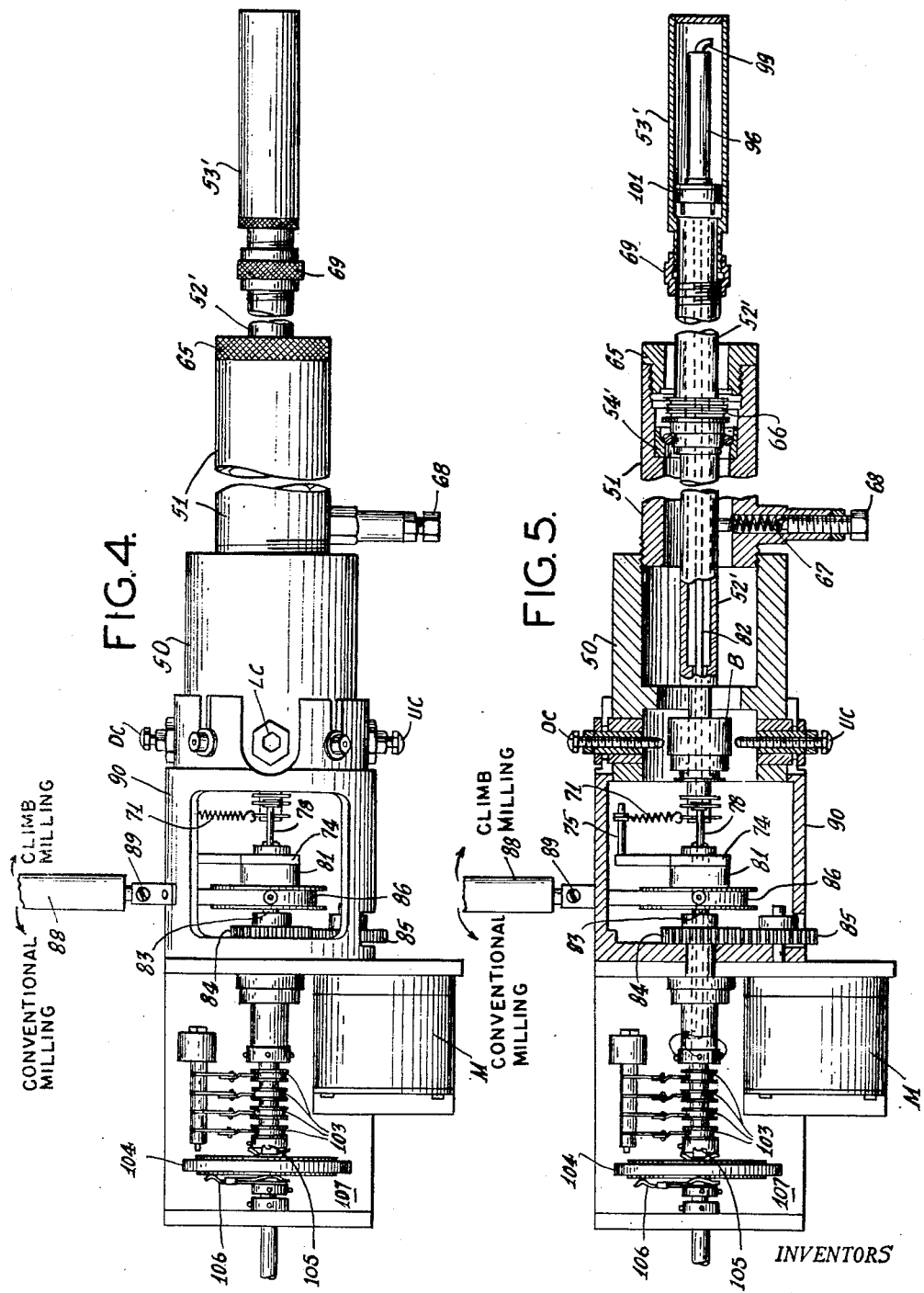

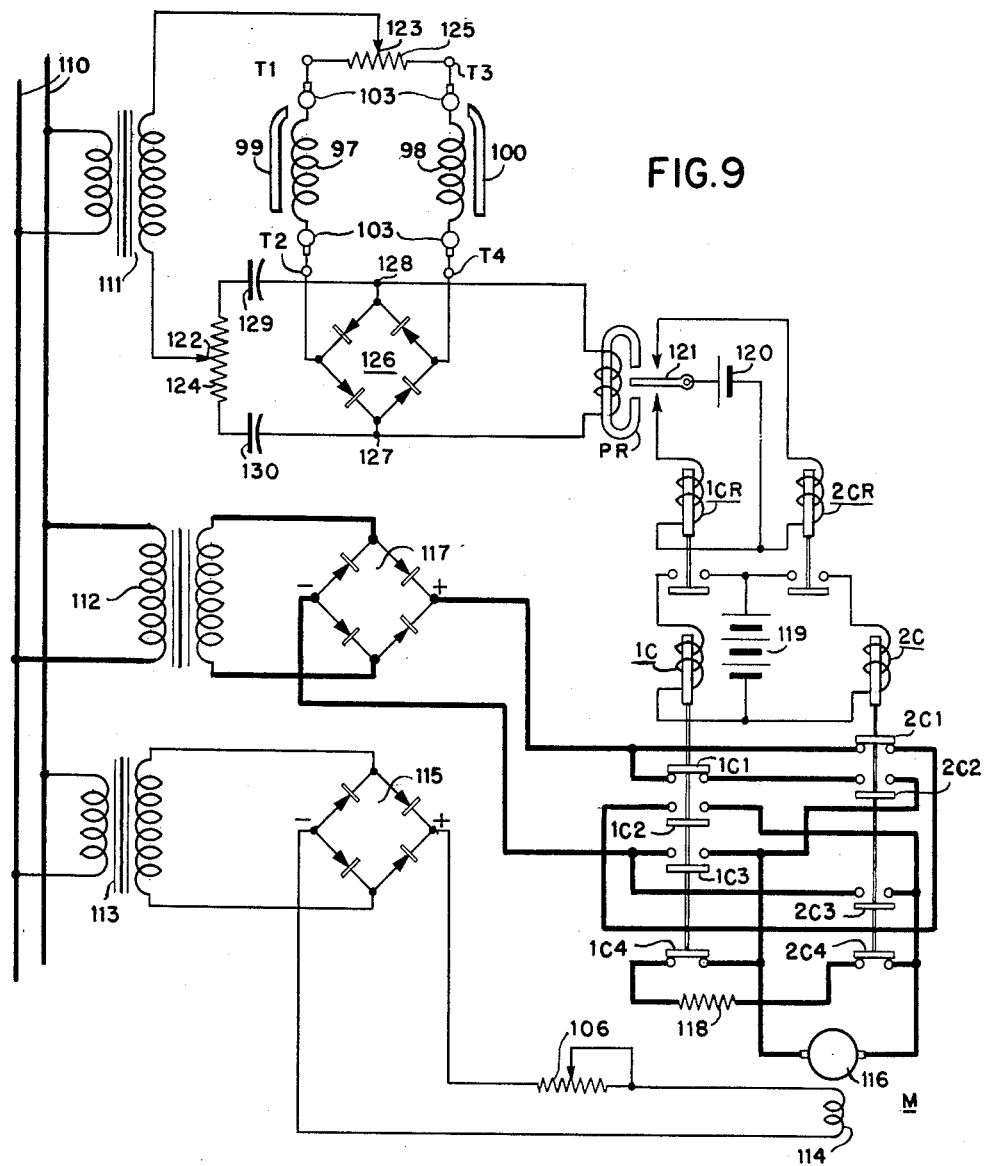

Nov. 26, 1957 — D. C. LAVIERI ET AL — 2,814,239
TRACER CONTROL FOR MACHINE TOOLS
Filed June 16, 1954 — 15 Sheets-Sheet 10

INVENTORS
Daniel C. Lavieri
William J. Hawley

BY

Ray J. Ernst
ATTORNEY

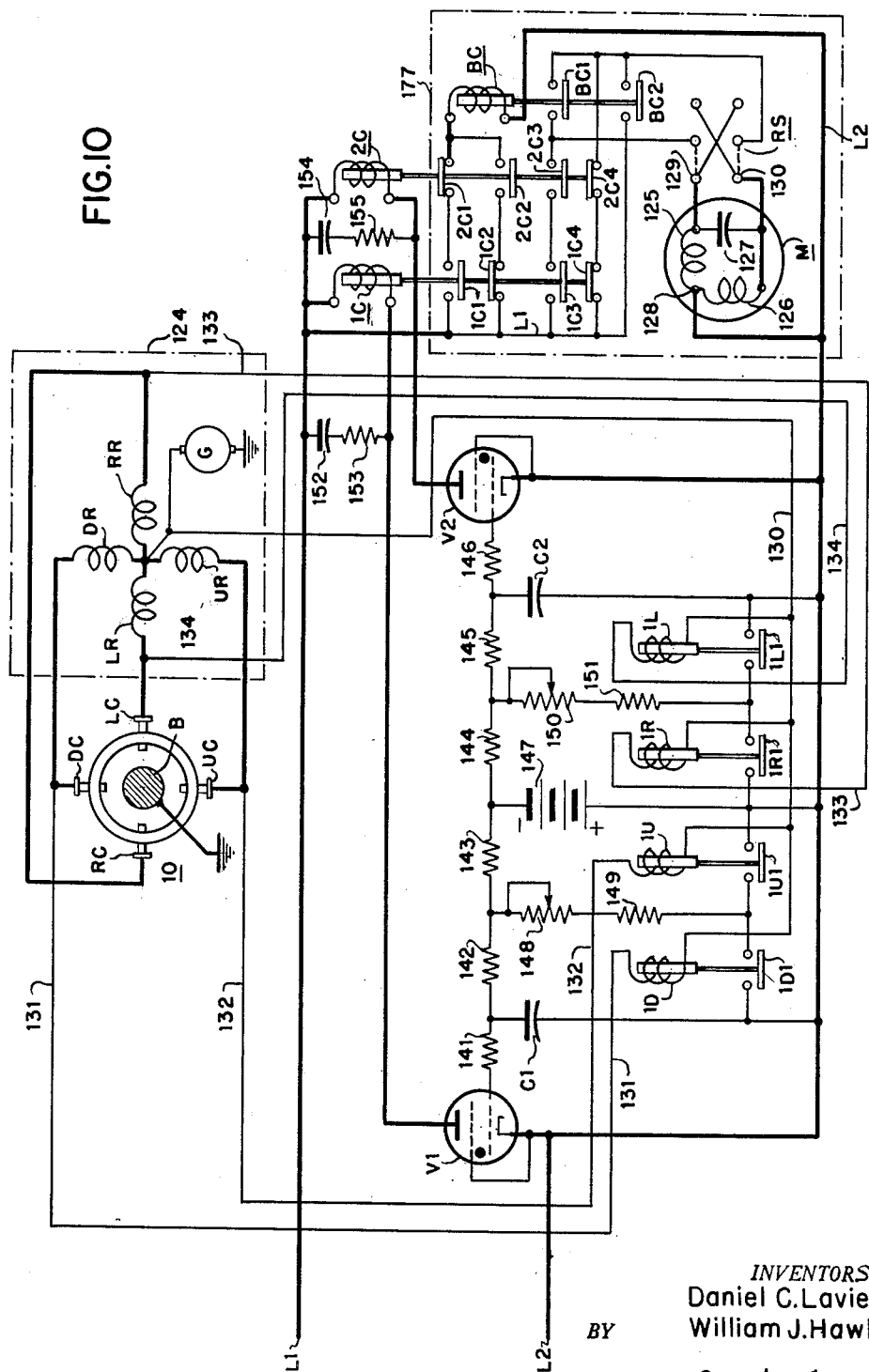

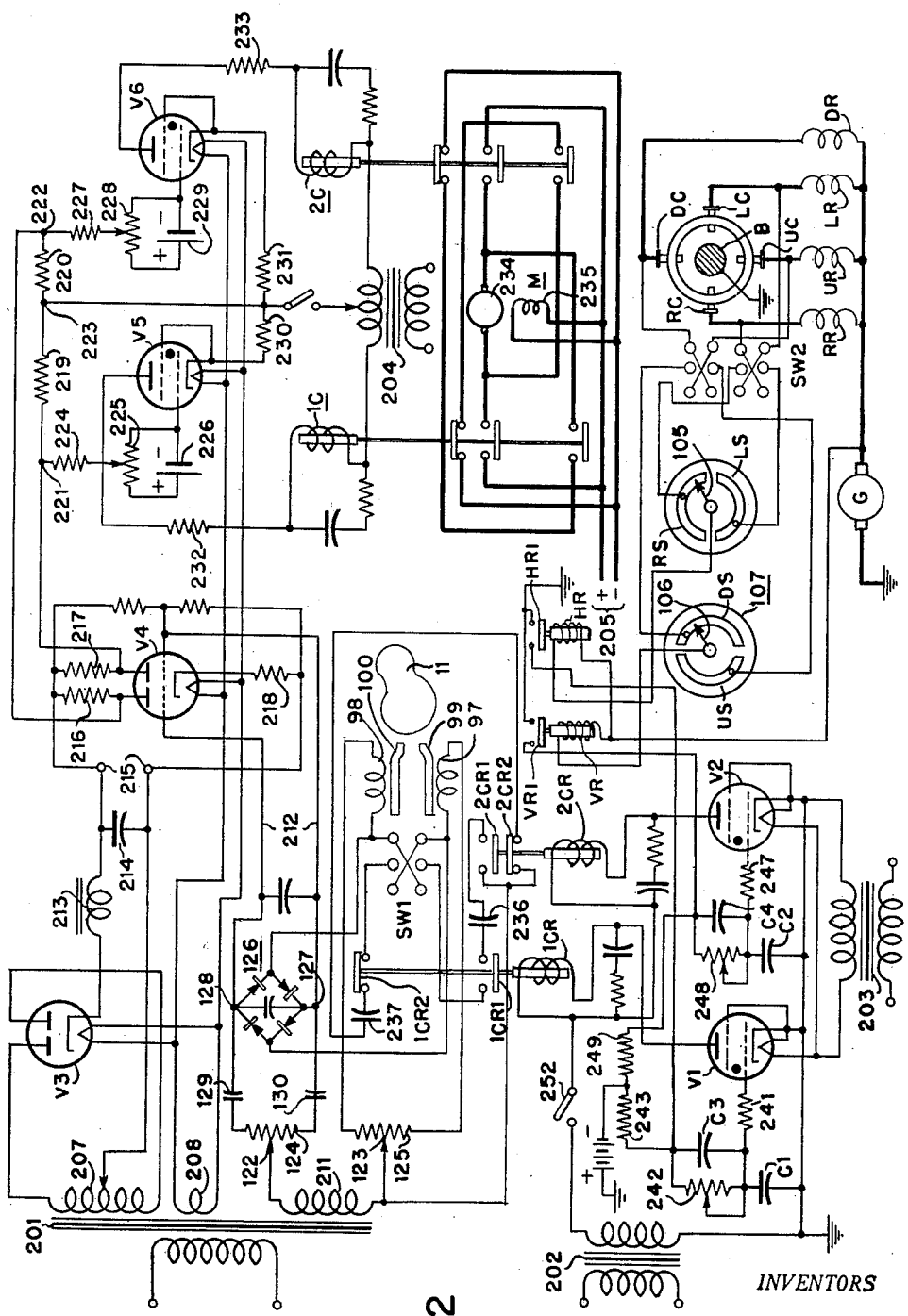

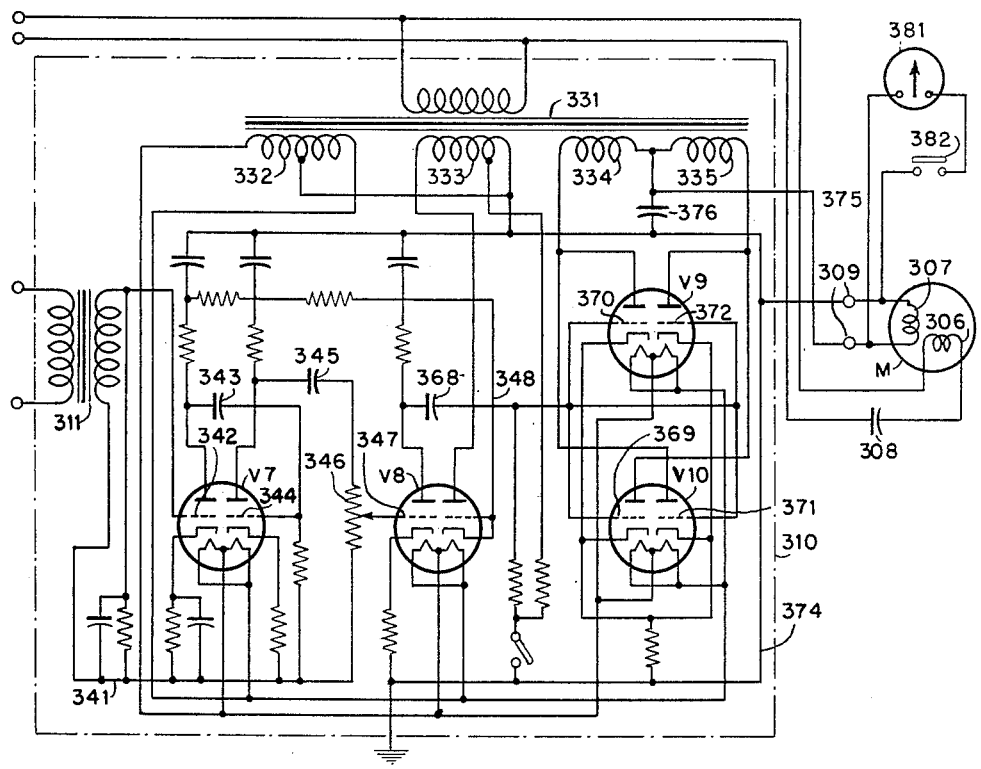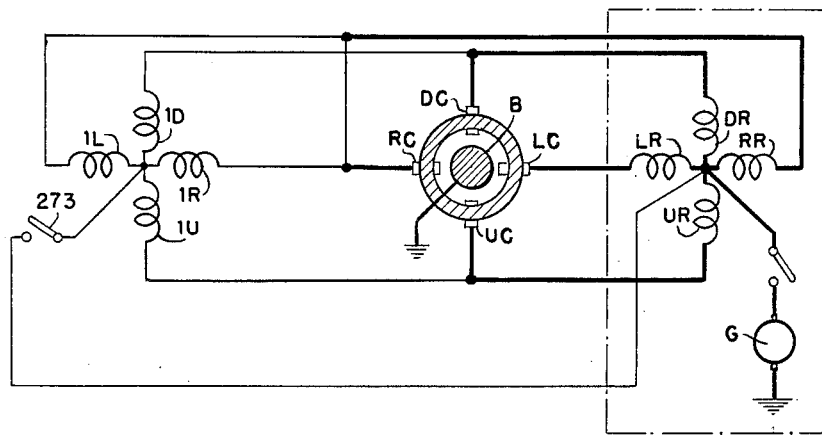
FIG.14b
*INVENTORS*
Daniel C. Lavieri
William J. Hawley

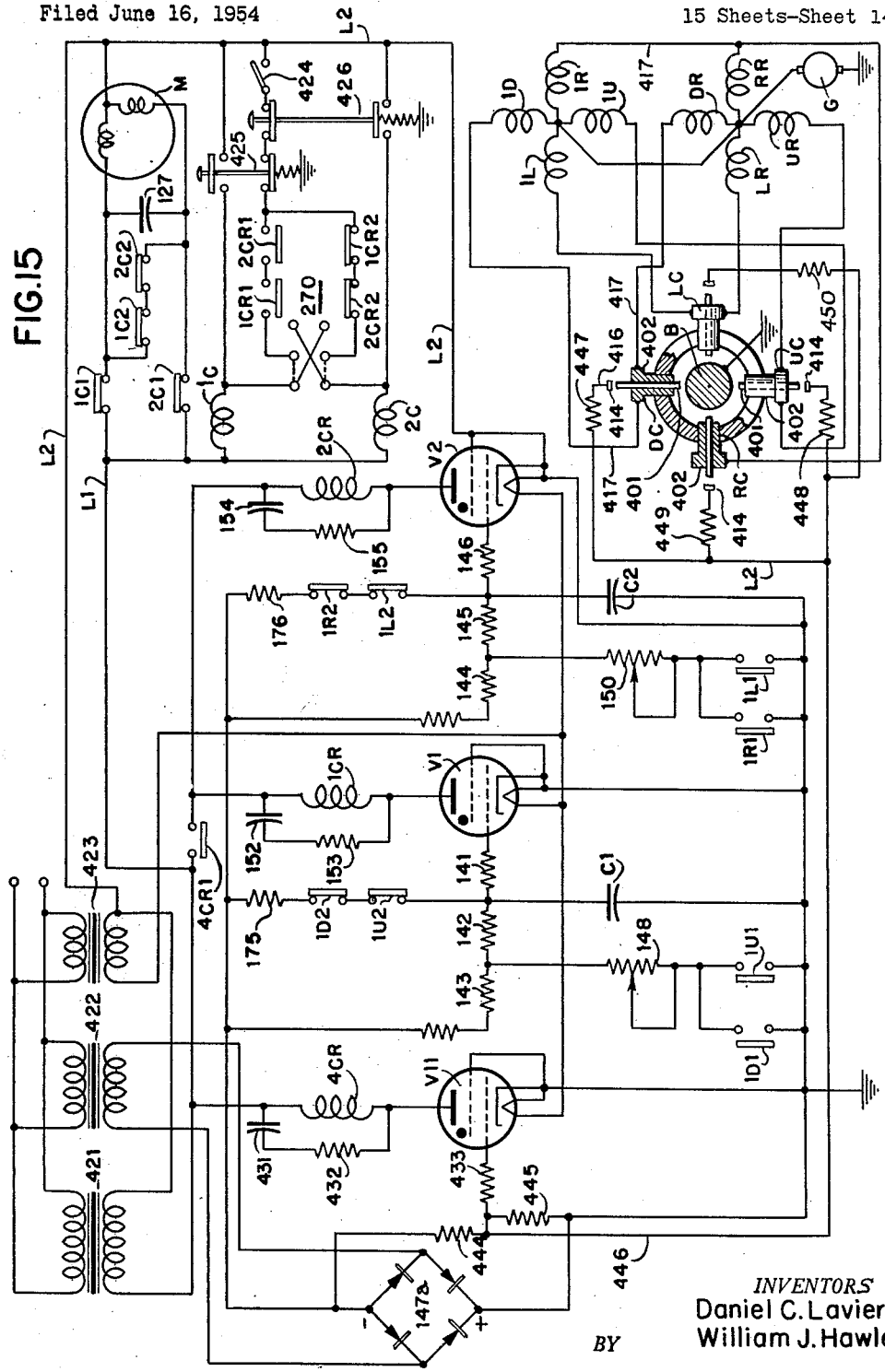

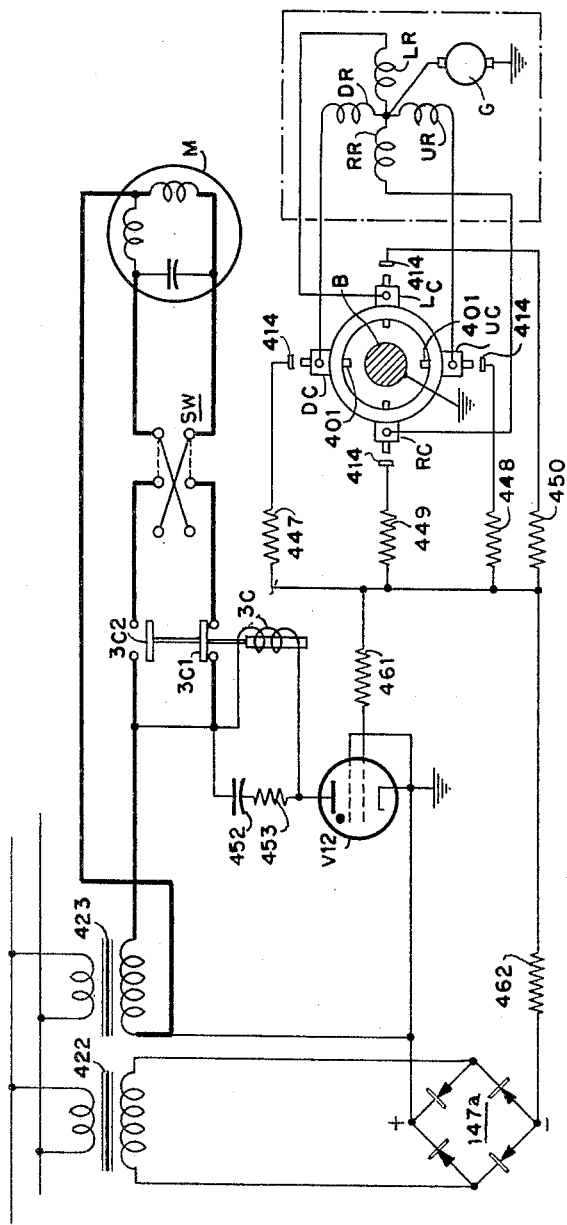
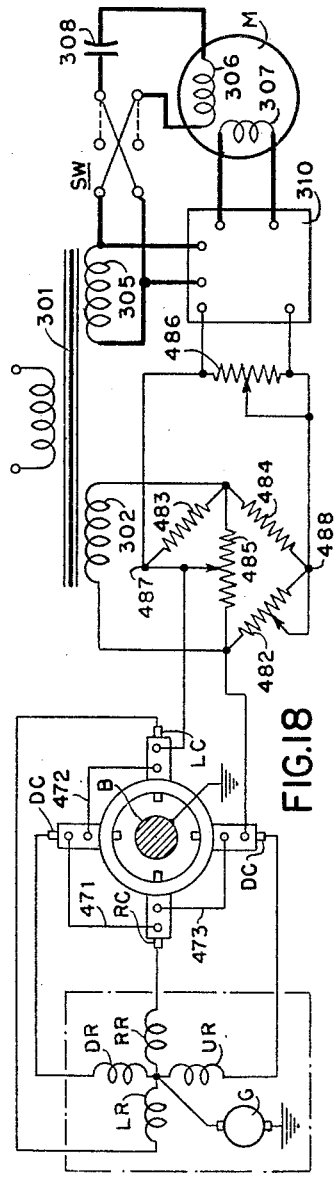
FIG.17
FIG.18

United States Patent Office 2,814,239
Patented Nov. 26, 1957

2,814,239
TRACER CONTROL FOR MACHINE TOOLS

Daniel C. Lavieri, Barkhamsted, and William J. Hawley, Farmington, Conn., assignors, by mesne assignments, to Pratt & Whitney Company, Incorporated, West Hartford, Conn., a corporation of Delaware Application June 16, 1954, Serial No. 437,061

50 Claims. (Cl. 90—62)

Our invention relates to devices for the automatic control of contour-machining operations in accordance with a template model being traced by a tracer.

In one of its more particular though not exclusive aspects, the invention relates to tracer controls for profile milling machines in which a revolvable cutter for machining a work piece and a tracer assembly for engaging the contour of a template model have a common support which can be displaced by means of respective horizontal and vertical feed screws in any resultant direction within a plane parallel to that of the template. In such machines, the tracer assembly has a spring-biased member which, when in operation, progresses along the template contour in contact engagement therewith. The tracer member, when permitted by the template to be deflected from a normal position by the spring bias, cooperates with four quadrangularly arranged electric contacts and thereby controls each of two feed-screw drives to run in one or the other direction thus producing a relative displacement between the tool-and-tracer support and the work in a resultant direction as needed to eliminate the tracer deflection. As a result, the tool follows a path along the work as defined by the contour of the template.

Such tracer controls have been used on milling machines of the type generally known as "Keller machines"; and, since our invention has first been practically applied to Keller machines, we prefer describing it in the following with reference to an example of such a machine, although it will be understood that the invention is also applicable with other milling machines and other machine tools suitable for profile machining operations under control by a tracer that is spring-biased toward the contour of a template model and controls two reversible feed-screw drives.

When a non-linear contour, such as a curve closed upon itself, is being machined, it is necessary to vary in the tracer assembly the direction of the spring bias so that the biasing force will always hold the tracer in proper contact with the contour of the template regardless of whether at any moment the direction of the tracer progression—that is, the tangential direction of the contour at the point where it is contacted by the tracer—is upward, downward, to the left, to the right or anywhere between these four cardinal directions. For that reason, and although the machine may otherwise operate automatically, the machines heretofore available require continuous attention by the operator. The operator is called upon to turn a handle and thereby continually set the spring bias to the direction needed for properly biasing the tracer against the template contour. This necessity for almost continuous attention, especially when complicated contours are being machined, is not only a considerable item of labor cost, but also presents a possible cause of costly trouble. Should the operator fail to properly adjust the spring bias at the proper time, the tracer will either run off the template into space or it will stall, depending upon the relation of the then effective spring bias direction to the change in tangential direction of the contour. When the tracer runs off, the tool may hit elsewhere against the work piece and thus damage the piece. In any event, a tracer run-off always leaves a portion of the work piece unmachined so that an additional machining run is required to correct the error, thus adding to the machining time and cost. When the tracer stalls, the work piece will be marked by the tool at the stalling point; and this may damage the work beyond repair.

It is an object of our invention to eliminate these shortcomings and to provide a tracer control for profiling machine tools that automatically sets its spring bias to the proper direction required at any point along the template contour and thus eliminates the need for manual attention as well as the danger that the tracer may stall or may run off the template. Generally, therefore, the invention aims at improving the tracer control toward fully automatic performance and at reducing the machining cost by minimizing cost of labor, machining time and occurrence of defective work.

Another object of our invention is to devise a contouring tracer assembly of the just-mentioned automatic performance that can readily be applied as an accessory to existing contour milling machines without requiring substantial changes in the design or basic wiring of the electric devices for the tracer-responsive control of the tool-feed drives.

To achieve these objects, and in accordance with a feature of our invention, we provide the tracing assembly for a machine tool of the above-mentioned kind with a pilot motor which operates independently of the two reversible feed drives and which, when running, imparts an angular displacement to the biasing spring means of the tracer; and we control the pilot motor by condition-responsive devices that respond to a variable condition of tracer operation dependent upon the geometric relation of the tracer bias direction to the contour of the template at the point of tracer engagement. As a result, the pilot motor automatically operates to shift the direction of the spring bias as needed for maintaining the tracer in proper engagement with the contour regardless of variations in the shape or tangential direction of the contour at the tracer point. In cases where the curvature of the template contour does not reverse, that is when the curvature is either concave only or is convex only, a control of the pilot motor in only one running direction may be sufficient. To permit a tracing operation in both directions of progression, however, a reversible motor, condition-responsively controlled as to running direction and running time, is needed.

According to further and more specific features of our invention, we have devised several principles or systems of securing the condition-responsive pilot-motor control in accordance with the geometric interrelation of tracer point and template contour.

(1) According to one of these principles, we provide the tracer, near its point of contact with the template, with electric gap-sensing means that, in connection with an electric circuit, vary an electric magnitude in one or the opposite sense from a given value whenever the conditions of a gap between the sensing means and the template depart from normal.

The sensing means may consist of any suitable devices or pick-ups that vary an electric magnitude, such as current, voltage or impedance, in response to dimensional variations of a gap. For instance, capacitive pick-ups or inductive pick-ups are applicable. However according to another feature of the invention, we prefer using two such sensing devices at the leading and trailing sides of the tracer point respectively; and we connect the two devices into a balanceable electric circuit to produce an output intelligence of one or the opposite direction whenever the circuit becomes unbalanced.

According to still another feature of the invention, we prefer using a pair of magnetic sensing devices of the variable-reluctance type in combination with such a balanceable circuit.

(2) According to another principle of sensing the geometric conditions of the tracer bias relative to the template contour, we take advantage of the fact that the performance of the feed-motion controls in a tracer-controlled profiling machine exhibits a peculiar behavior that likewise depends upon the directional relation of the tracer-spring bias to the shape or tangent of the template contour at the tracer-contacted point and thus inherently involves a variable condition of the kind required for controlling the tracer spring bias in accordance with our invention. This variable condition is the following:

Two component feed motions, one vertical—up or down—and one horizontal—right or left—may occur simultaneously for producing any resultant tracer motion in the direction tangential to the contour at the instantaneous contour point being contacted by the tracer; and either one of these two component motions may predominate over the other unless both happen to be equal. As a result, and as will be further explained, the feed control circuits of the machine may operate according to any one of four conditions: (*a*) the feed control for vertical motion (up or down) may operate steadily while at the same time the control for horizontal motion (right or left) operates intermittently, or (*b*) the operation of the "vertical" feed control may be intermittent (stepping) while that of the "horizontal" feed control is steady, or (*c*) the operation of both feed controls may be steady, or (*d*) the operation of both feed controls may be stepping.

The first two conditions of operation (*a*) and (*b*) are normal; that is, they do not involve the danger of the tracer running off the template or stalling. The third alternative condition (*c*) is critical when tracing a convex contour as it involves the possibility of the tracer to run off. The fourth condition (*d*) of operation is critical as it may result in stalling.

According to our invention, therefore, we take advantage of this condition-responsive behavior, and we derive the intelligence for the control of the tracer-bias adjusting motor from the operation of the feed-control contacts of the tracer assembly. To this end, we connect with these control contacts a group of discriminating devices to control the pilot motor in dependence upon whether the two feed motions are steady or stepping at a time.

According to a more specific feature, these discriminating devices consist of integrating circuits connected with electronic relays or valve means to be triggered or controlled when the energizing intervals of the respective feed-motion control circuits have a given duration.

(3) According to a third principle of controlling the spring-adjusting pilot motor of the tracer in accordance with our invention, we utilize the phenomenon that the deflecting force imposed upon the tracer member by its spring-biased engagement with the template is a variable magnitude and depends upon the geometric relation of the tracer bias direction to the contour of the template at the tracer point. We, therefore, provide the tracer assembly with pressure-responsive sensing means and control the pilot motor by the electric variations caused by the sensing means.

The pressure-responsive sensing means may be located at any place suitable to make them respond to variations in contact pressure between template and tracer. However, according to another feature of our invention, we provide the tracer assembly with four such pressure-responsive means and combine them with the four quadrangularly-arranged control contacts or other feed-control devices of the assembly so that the sensing means respond to the contact pressure exerted by the deflection of the tracer member upon the respective control contacts or devices.

The pressure-sensing means may consist of any transducers capable of translating mechanical force into an electric variation. For instance, piezo-electric or magneto-strictive gauges, as well as variable-resistance gauges such as carbon-pile resistors or metal-wire strain gauges are applicable. According to another feature of our invention, however, the sensing means may also consist of pressure-responsive devices of the make-and-break type that open or close a contact when the pressure between the tracer member and the feed-control contacts of the tracer assembly drops below an adjusted magnitude.

(4) A further principle of condition-responsively controlling the tracer pilot motor according to our invention consists in a combination of any two of the condition-responsive control means described under (1), (2) and (3).

In accordance with other and more specific features of such a conjoint control of the tracer pilot motor, we effect the control of the pilot motor mainly in response to feed-responsive control as set forth under (2) and superimpose thereon a corrective control in response to pressure-responsive means as described under (3).

Our invention further involves novel features concerning various apparatus and devices, as well as various modifications and improvements of the electric circuitry, to be used as components of the above-described pilot-motor control means. All of these features, set forth with particularity in the claims annexed hereto, as well as the above-mentioned and other objects and advantages of the invention, will be apparent from, or will be described in, the following in conjunction with the drawings.

Fig. 1 of the drawings is a perspective view, from the operator's place, of a Keller-type milling machine with a contouring tracer assembly according to the invention.

Fig. 2 shows schematically the basic tracer-controlled circuits for operating the vertical and horizontal feed screws of the machine shown in Fig. 1, in conjunction with a schematic and perspective illustration of a tracer assembly according to the invention.

Figs. 2*a* to 2*d* are explanatory and relate to the resultant spring-bias effect occurring in a tracer assembly according to Fig. 2.

Fig. 4 is a side view and Fig. 5 is a longitudinal section of the same tracer assembly as shown in Fig. 3.

Fig. 9 is a schematic circuit diagram according to the invention for controlling the spring-bias adjusting motor of a tracer assembly as shown in the preceding figures, the control being responsive to intelligence produced by gap-sensing pick-up means.

Fig. 10 is a schematic circuit diagram for controlling the spring-bias adjusting motor in response to control intelligence derived from the electric operation of the feed-control circuits.

Figure 13:
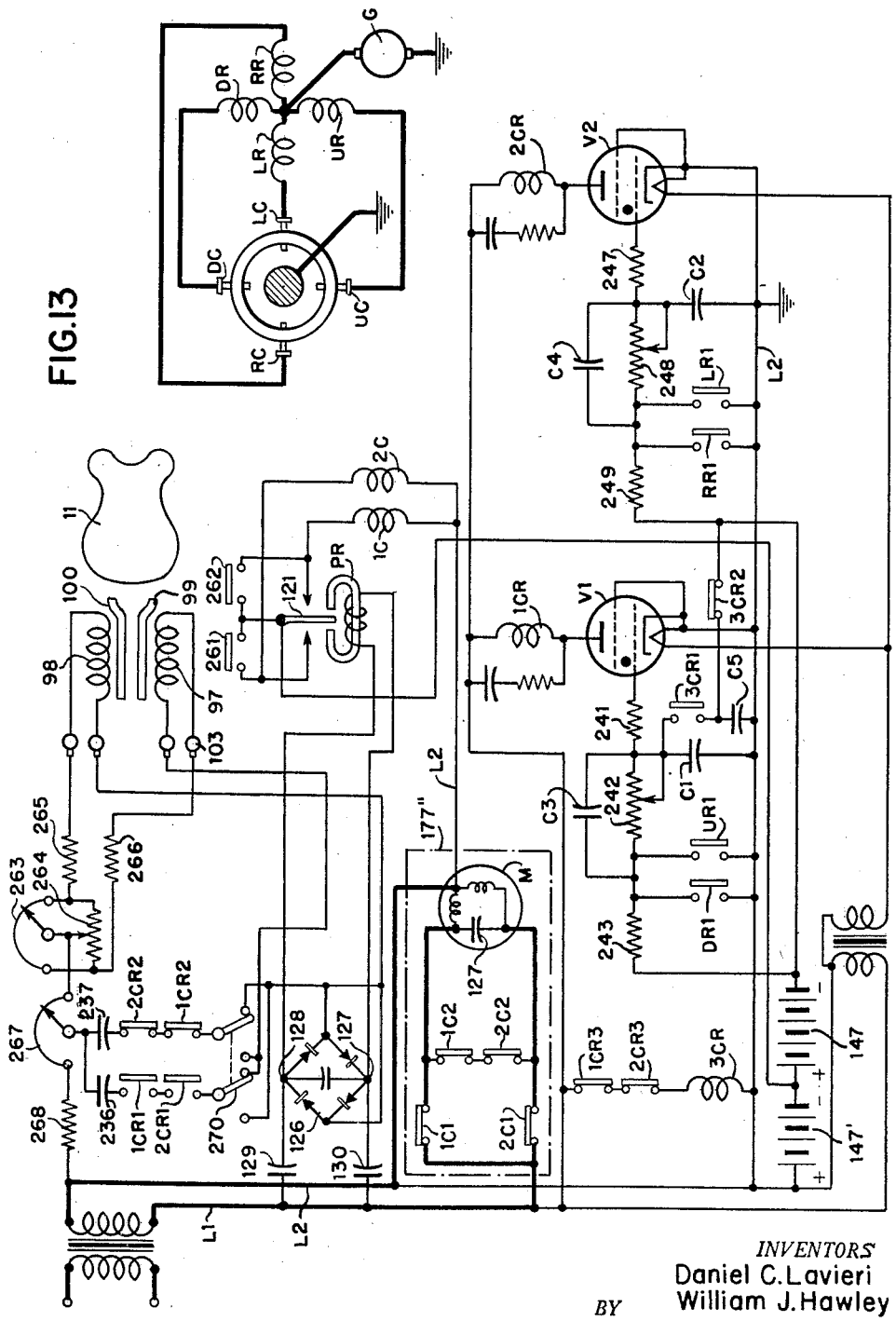

Figs. 12 and 13 are schematic circuit diagrams of two different systems for controlling the spring-bias adjusting motor of the tracer assembly in response to intelligence produced by gap-sensing feeler means and also in response to control intelligence inherent in the electric operation of the feed control circuits, the latter response being effective to impose a corrective compensation upon the control operation of the gap-sensing feeler means.

Figure 14A:
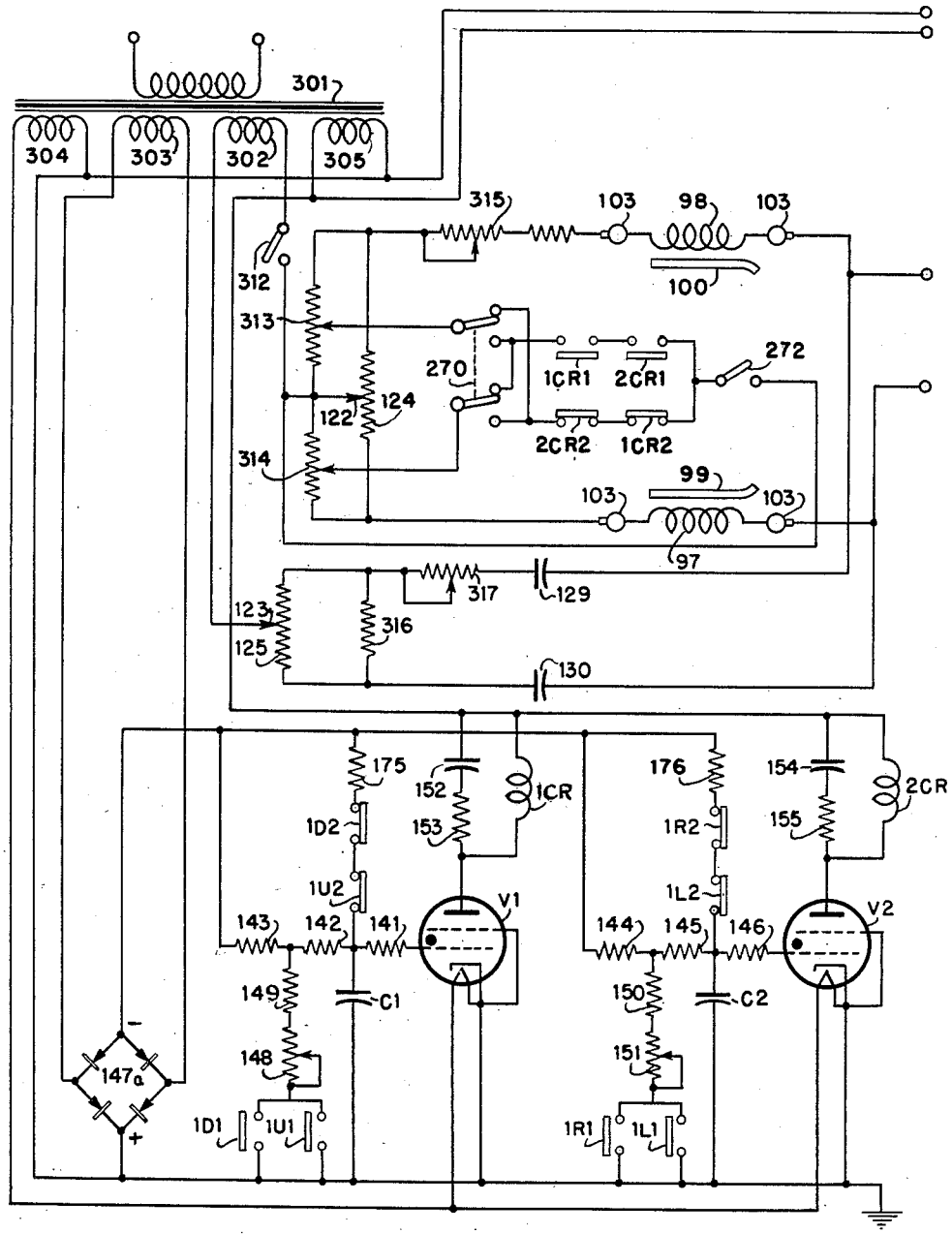

Figs. 14a and 14b show together a straight-line circuit diagram of still another control system for the spring-bias adjusting motor, also involving a gap-responsive and compensated control action. Figs. 14a and 14b should be placed together, with Fig. 14a at the left of Fig. 14b so that the connecting electric leads register with one another. In the following, both figures are collectively referred to as "Fig. 14."

Fig. 15 is a straight-line circuit diagram of a control system involving a feed-responsive pilot-motor control and a superimposed, overriding control in response to contact pressure at the feed-control contacts of the tracer assembly.

Fig. 16 is a cross section of one of the four pressure-responsive contact devices of the tracer assembly in a system according to Fig. 15.

Fig. 17 shows schematically an embodiment of a pilot-motor control system operating exclusively in response to the on-and-off operation of pressure-responsive devices of the type shown in Fig. 16.

Figure 19:
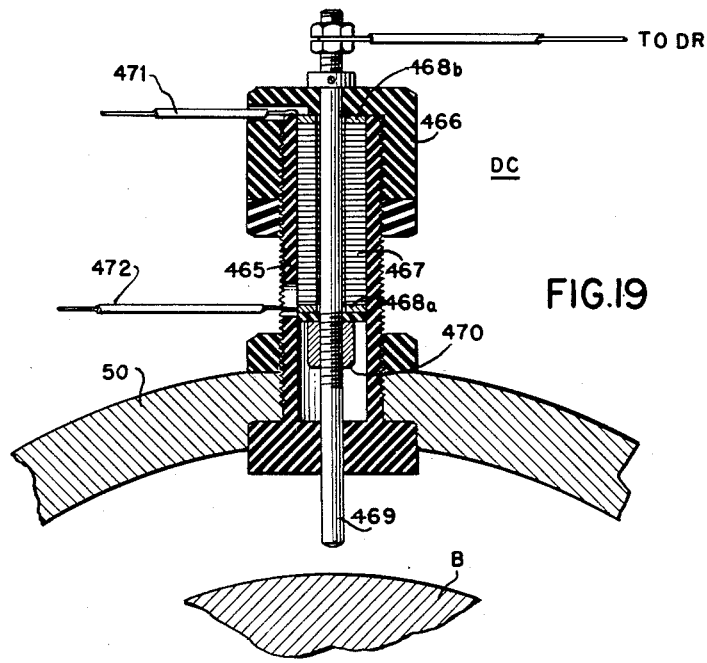

Fig. 18 is a schematic circuit diagram of another control system operating in response to continuously variable control intelligence supplied from contact-pressure sensing devices; and Fig. 19 is a cross section of one of these sensing devices.

The bed casting 1 of the machine shown in Fig. 1 has slideways 1a on which a transverse slide 2 is displaceable. Slide 2 has horizontal slideways that extend at right angles to those of the bed casting and support a work table 3. An upright column 4 joined with the bed casting 1 forms a third slideway in the vertical direction for a saddle or vertical slide 5. Slide 5 forms a support for the cutter spindle 6 with the cutter 7 for milling a work piece 8. A tracer bracket 9 firmly secures a tracer assembly 10 to the slide 5 so that the tracer axis is parallel to the tool axis. The free end or "point" 53 of the tracer assembly 10 engages the contour of a template 11 whose shape is to be duplicated on the work piece 8 by the milling operation of the cutter 7. The work piece 8 and the template 11 are firmly attached to a holding fixture 12 fastened to the work table 3.

A transverse (in and out) displacement can be imparted to the horizontal slide 2 by means of a feed screw 13 operable by a hand wheel 14. For automatic machine operation, the feed screw 13 may be driven by an electric motor located behind the work table and not visible in Fig. 1.

The work table 3 can be horizontally displaced at a right angle to the slide 2 by means of a feed screw 15 operable through a shaft 16 by a hand wheel 17. During automatic operation, the feed screw 15 is driven from an electric motor through controllable electromagnetic clutches. This drive, located behind the machine and not visible in Fig. 1, will be more fully described with reference to Fig. 2. The vertical feed motion of the slide 5 carrying the cutter spindle 6 and the tracer assembly 10 is controlled by a feed screw 18 which may be operated by a hand wheel 19. For automatic operation, the screw 18 is driven from an electric motor located at 20 and controlled by electromagnetic clutches also described below with reference to Fig. 2.

The tracer bracket 9 can be vertically displaced relative to the slide 5 by means of a feed screw 21. Further positional adjustments of the tracer relative to the cutter spindle 6 may be made by means of knobs 22 permitting the tracer assembly 10 to be placed in the position best suitable for a particular job. A clamping knob 23 serves to lock the tracer assembly to bracket 9 in the properly adjusted position. The cutter spindle is driven by a transmission 24.

As shown in Fig. 1, the work piece 8 and the template 11 are mounted in a vertical plane parallel to the horizontal direction in which the work table 3 is displaceable by the feed screw 15. Once the machine is properly set up for tracing operation, the in-and-out feed screw 13 need not be operated for the profile tracing operations to be further described in this specification. It should be understood, however, that the illustrated machine and the tracer controls according to the invention are also applicable for three-dimensional work. For instance, when the template is arranged in a plane inclined to the horizontal plane of the work table displacement, then the transverse (in and out) feed screw 13 must also be operated, and this may be done by using a depth tracer in addition to the profiling tracer described in this specification. As to this possibility of three-dimensional work by means of a special depth tracer, the invention does not differ from the prior art, and for that reason the following description is limited to tracing in a vertical plane.

It will be noted that the tracer assembly 10 is moved relative to the bed casting 1 only in the vertical direction, that is, either up or down, while any horizontal feed motion is imparted to the work table 3, and hence to the template 11 and the work piece 8, rather than to the tracer assembly. However, for simplicity, and since it is not essential to the invention how and to what particular parts the component feed movements are applied, reference will be made in the following only to the feed motion of the tracer assembly relative to the template. That is, the terms "up" and "down," "left" and "right," as used hereinafter, designate the movements of the tracer as they appear from the operator's place (Fig. 1) and as if the template were stationary.

As apparent from Fig. 2, the horizontal feed screw 15 for displacing the work table 3 is driven through a spur gear 31 from a pinion 32. Pinion 32 can be selectively coupled by magnetic clutches 33 and 34 with respective clutch parts 36 and 35 that are continuously driven by an electric motor (not shown) to revolve in mutually opposed directions. The magnetic clutches are connected to the leads Lp and Ln of a direct-current line (for instance, 110 volts) and are controlled by respective feed-control relays RR and LR. When relay RR is energized, the feed screw 15 is driven to move the tracer assembly 10 to the right. When relay LR is energized, clutch 34 is operative to drive the feed screw 15 in the opposite direction, thus moving the tracer assembly 10 relative to the template 11 toward the left.

The feed screw 18 for the vertical feed motion of the slide 5 is driven through a spur gear 41 from a pinion 42 that can be selectively coupled by magnetic clutches 43 and 44 whose respective clutch members 45 and 46 are continuously driven by an electric motor (not shown) to revolve in mutually opposing directions. The magnetic clutches are connected to the supply line Lp, Ln through the contacts of respective feed-control relays UR and DR. When relay UR is energized, clutch members 43 and 45 are effective to drive the feed screw 18 for displacement of the tracer assembly in the upward direction. When relay DR is energized, clutch members 44 and 46 are effective to operate feed screw 18 for downward movement of the tracer assembly.

The four feed-control relays UR, DR, RR and LR are selectively controlled by the operation of the tracer assembly 10. The tracer assembly has a stationary sleeve 51 firmly secured to the bracket 9 (Fig. 1). A tracer spindle 52 extends through the sleeve 51 and carries at its forward end a member called the "tracer point" 53 which has the same diameter as the milling cutter and serves to engage and follow the contour of the template 11. The tracer spindle 52 is pivotally secured to the sleeve 51 by a universal-type pivot bearing 54 to permit the spindle to deflect angularly in all directions from the normal, coaxial position.

The tracer sleeve 51 is joined with a coaxial housing portion 50 (Fig. 1) which carries four mutually insulated contacts DC, UC, RC, LC, whose contact points are located in quadrangular relation to one another. Located between the four contacts is a contact block B which forms part of the tracer spindle 52 (Fig. 2). The four tracer contacts are connected to the terminals DT, UT, RT and LT of the respective feed-control relays DR, UR, RR, LR. The other terminals of the relays are connected by a common lead 47 with one pole of a current source G whose other pole is grounded. In the available milling machines of the illustrated type, this current source consists of a direct-current generator located in the machine cabinet and supplying a voltage of 12 volts.

Revolvably mounted on the housing supporting the contacts UC, DC, LC, RC is a ring 55. A pin projecting from ring 55 serves as a holder for one end of an expansible bias spring 57 whose other end is secured to the tracer spindle 52. Spring 57 biases the block B of tracer spindle 52 toward engagement with one or two of the four tracer contacts depending upon the rotational position of ring 55. A pilot motor M, preferably of the reversible type, is geared to ring 55 and, as will be explained, is automatically controlled to angularly position the ring 55 in response to a variable condition of the tracing operation.

The various angular positions that must be given to the tracer biasing spring 57 during a complete cycle of tracing operation will be understood from the diagrams shown in Figs. 2a to 2d. Assume that in Fig. 2 the tracer point 53 is in the position "a" relative to the template 11 and is progressing in the clockwise direction indicated by the arrow 61, the milling tool 7 (Fig. 1) being a "right-hand" cutter and revolving clockwise as seen from the operator's place. Under these conditions (climb milling), the bias spring 57 must impose on the tracer spindle 52 and on the contact block B a force in the direction apparent from Fig. 2a. The tension of the bias spring pulls the contact block B against contacts DC and RC while keeping the block away from contacts LC and UC. This closes the circuits of feed-control relays DR and RR to cause tracer and cutter motion downward and to the right relative to template and work piece. If the down motion forces the tracer point 53 against the template edge sufficiently, the tracer spindle 52 will pivot about the universal pivot bearing 54 and disengage the contact block B from contact DC thereby stopping the downward feed motion. Additional down motion would have forced the contact block to touch contact UC so that upward motion would have taken place. If there had been too much right motion relative to down motion, the tracer point would have left the template. On the other hand, if the bias spring is rotated too far clockwise, there may not be sufficient force to hold the contact block B against contact RC and the tracer and feeds would stall when block B leaves both contacts DC and RC. When the tracer point reaches the position shown in Fig. 2 at b, the bias spring should be positioned somewhat as shown in Fig. 2b. For position c in Fig. 2, the corresponding bias spring position is shown in Fig. 2c. For position d of the tracer point (Fig. 2), the proper position of the bias spring 57 is shown in Fig. 2d.

While in the past the task of properly positioning the bias spring at the proper time was assigned to the operator of the machine and was done manually by "feel" and guided by continual inspection of the particular contour range being encountered or about to be encountered by the progressing tracer point, the pilot motor M (Figs. 1, 2) in a control system according to the invention is so controlled that the entire adjusting operation is effected automatically in response to intelligence indicative of the geometric relation of the tracer bias direction to the tangential direction of the template contour at any instant or point of tracer progression. However, before turning to a description of control circuits provided by our invention for the just-mentioned purpose, a tracer design especially favorable for such control purposes will first be described.

Figure 3:
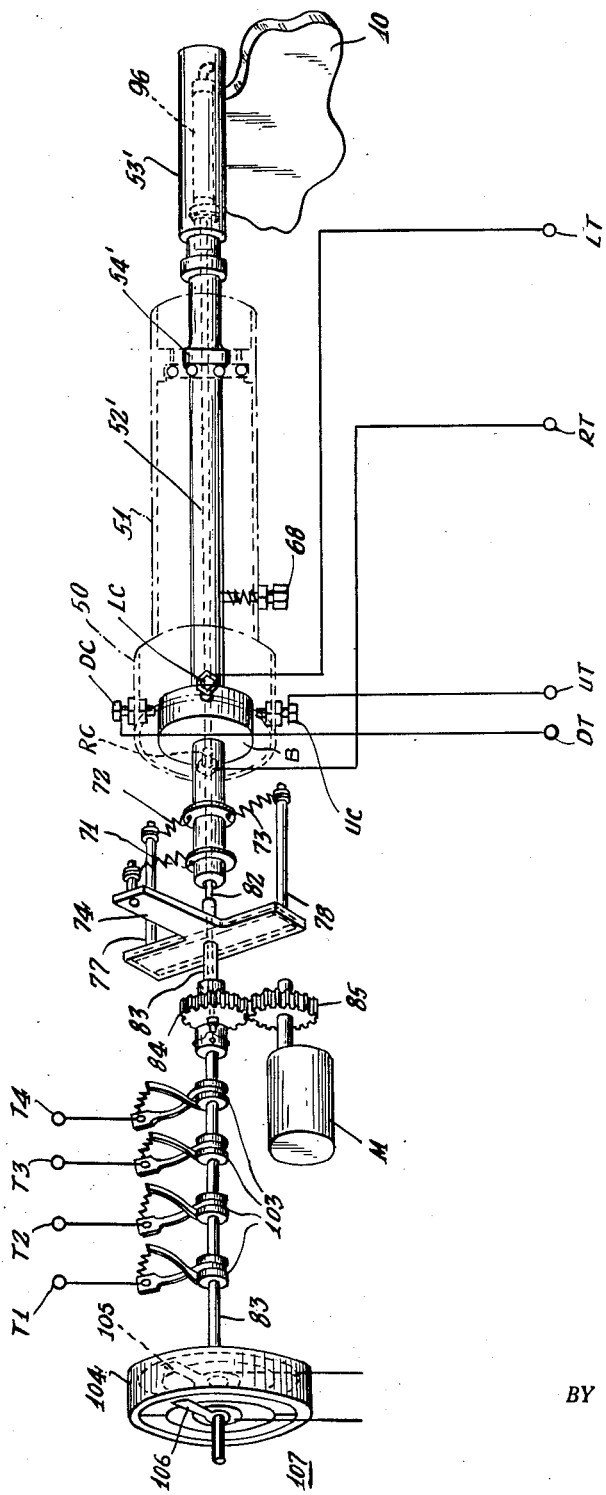
Fig. 3 is a schematic and perspective view of another, more elaborate tracer assembly according to the invention.

The tracer assembly shown in Figs. 3 to 5 has a sleeve 51 to be firmly mounted on the vertical slide 5 (Fig. 1) of the milling machine. The tracer spindle 52' is mounted in generally coaxial relation to the sleeve 51 by means of a universal pivot bearing 54' which permits the bar 52' and the tracer point 53' to perform angular movements relative to the tracer sleeve 51, as described in conjunction with Fig. 2. Such movement has the result of placing a contact block B into electric engagement with the feed-control contacts UC, DC, RC and LC of the tracer assembly, also as explained previously.

The tracer spindle 52', according to Figs. 3 to 5, consist of a tube and the tracer point 53' is likewise tubular. The spindle 52' is secured to the tracer sleeve 51 by means of a threaded ring 65 which forces a coaxial spring 66 (Fig. 5) against a shoulder of spindle 52' thus holding the shoulder against the universal pivot bearing 54'. The spindle 52' is contacted from below by a resilient abutment member supported by a spring 67. The tension of spring 67 can be adjusted by a screw 68 for properly counterbalancing the weight of the tracer spindle 52 and of the masses attached thereto.

The tracer point 53' is separably joined with spindle 52' by a nipple ring 69 which permits substituting the tracer point by one of different diametrical size for readily adapting the tracer to milling cutters of any diameter.

The terminals DT, UT, RT, LT of the tracer assembly shown in Fig. 3 are to be connected to the feed control system of the milling machine as shown in Fig. 2 for the same respective terminals.

In contrast to the provision of a single biasing spring 57 as shown in Fig. 2, the tracer assembly according to Figs. 3 to 5 is equipped with a triple-spring assembly which we have found to be preferable in cases where it is desired to have the tracer selectively operate either in clockwise or counterclockwise progression along the template. As apparent from Figs. 2a to 2d, the biasing force exerted by the spring upon the tracer bar lags a certain angle behind the point at which the template contour is contacted by the tracer. Figs. 2a to 2d are drawn for "climb milling," that is, for operation with a clockwise revolution of a right-hand cutter (seen from the operator's place) and a clockwise progression of the tracer. When the tracer is to progress in the opposite direction ("conventional milling"), it is, of course, necessary to set the biasing spring to a different angle. Such a selective adjustment of the spring force for either clockwise progression (climb milling) or counterclockwise progression (conventional milling) is afforded by the triple-spring (T-spring) assembly shown in Figs. 3, 5 and explained presently with further reference to the details illustrated in Fig. 6.

Figure 6:
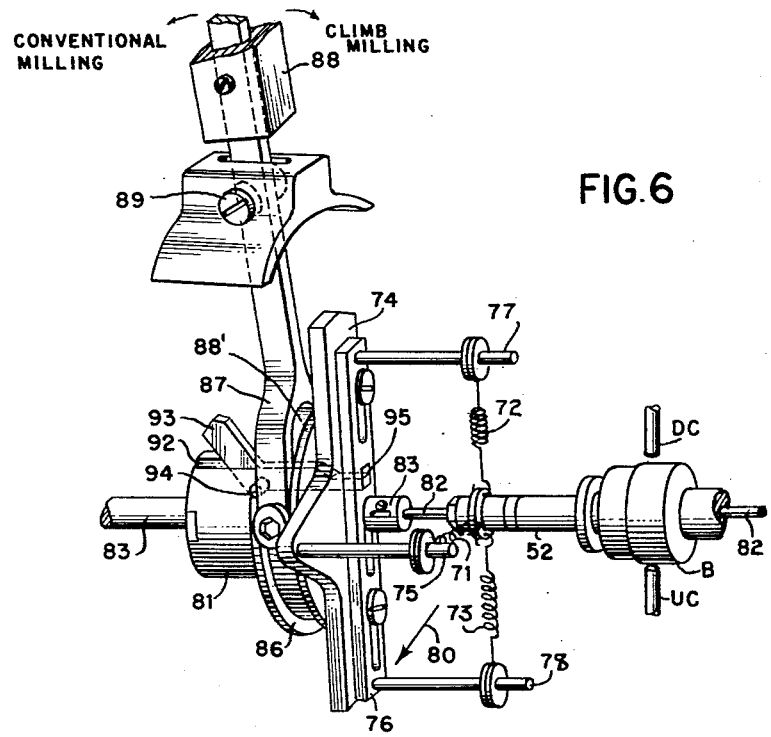
Fig. 6 is a schematic, perspective view of a device that forms part of the tracer assembly according to Figs. 3 to 5 and serves to set the spring bias for either clockwise or counterclockwise progression of the tracer point around the template contour.

The spring assembly comprises a "radial" spring 71 and two coaxially aligned "tangential" springs 72 and 73 (Figs. 3, 6). These springs are mounted on a T-shaped member 74 which carries a pin 75 to which one end of the radial spring 71 is attached. The other end of spring 71 is fastened to the end of the tracer bar 52'. A slider 76 is displaceably mounted on T-member 74 by means of screws that traverse respective elongated openings of the slider 76. The slider 76 carries two pins 77 and 78 to which the respective outer ends of the two springs 72 and 73 are attached. The inner ends of these springs are connected with the end of the tracer spindle 52'. Depending upon the position of the slider 76 relative to the T-member 74, one of the springs 72, 73 is completely relaxed while the other is extended and under tension. For instance, in the position of slider 76 shown in Fig. 6, spring 72 is relaxed and spring 73 is tensioned.

In that position of slider 76, the two springs 71 and 73 are jointly effective to produce a resultant biasing force in the direction of the arrow 80. When the slider 76 is moved to its other end position, the spring 73 is made ineffective while spring 72 is tensioned. Then the springs 71 and 72 jointly produce a resultant biasing force displaced clockwise from arrow 80 to a position within the angle defined by contacts DC and RC. The setting shown in Fig. 6 is suitable for counterclockwise progression (conventional milling). The other setting is needed if the tracer is to progress clockwise (climb milling).

The T-member 74 is integral with a cylinder 81 which is seated on a quill shaft 83 and firmly joined with a tubular shaft 82. Quill shaft 83 carries a spur gear 84 in meshing engagement with a gear 85 driven by the motor M. The pilot motor M, when running in one or the other direction, rotates the cylinder 81 and the T-member 74 accordingly, thus changing the direction of the resultant spring bias as explained with reference to Figs. 2a to 2d.

A peripherally grooved ring 86 is axially displaceable on cylinder 81 and is straddled by a bifurcated arm 87 of a lever 88 which is connected to a semi-circular thrust bearing 88′ slidably seated in the groove of ring 86. Lever 88 is pivoted at 89 to a stationary housing 90 (Figs. 4, 5) firmly joined with the housing portion 50 of the tracer sleeve 51. The cylinder 81 has a groove 92 in which an angular rocker 93 is pivoted on a cross pin 94 (Fig. 6). The rocker 93 has an extension 95 entering into an opening of the slide 76. When ring 86, by actuation of the lever 88, is being shifted to one of its end positions, the rocker 93 is turned about its pivot pin 94 to shift the slide 76 into the position where only one of the springs 72, 73 is tensioned as explained above. When the lever 88 and the ring 86 are placed in the other end position, the rocker 93 is turned in the opposite direction about pivot 94 so that the slider 76 moves to the position where the other spring 72 or 73 is tensioned.

The above-described T-spring assembly is applicable to advantage regardless of whether the tracer is also provided with the sensing device and other auxiliaries still to be described, or whether the tracer is otherwise of a simpler design such as shown in Fig. 2.

The tracer acording to Figs. 3 to 5 is further equipped with a magnetic gap-sensing device 96 located within the tubular tracer point 53′ which in this case must consist of non-magnetic material. The sensing device is composed of two coils 97 and 98 with respective iron cores 99, 100 (Figs. 7, 8) that extend out of the ends of the coils and are bent and chamfered to form two pole pieces.

The coils 97 and 98 are mounted on an insulating plug 101 with four contact prongs 102. The plug is inserted into a receptacle rigidly connected to the tubular shaft 82 (Figs. 3, 5), this shaft consisting preferably of stainless steel. The tubular shaft 82 extends freely through a clearance hole in the tracer bar 52′ and a short distance into the quill shaft 83 (Figs. 3, 6) of the T-spring assembly. Shaft 82 is locked to quill shaft 83 by set screws. Consequently, shaft 82 and sensing device 96 are revolvable together with the T-member 74 of the spring assembly independently of tracer spindle 52′ and tracer point 53′ so that the sensing device 96 changes its angular position in accordance with any change in position imparted to the spring assembly by the pilot motor M.

Four insulated wires inside the tubular shaft 82 connect the two coils 97 and 98 of the sensing device to four slip rings 103 (Figs. 3 to 5) rigidly joined with the quill shaft 83 of the spring assembly to revolve together therewith. The slip rings 103 are connected by respective contact brushes with terminals T1, T2, T3 and T4 (Fig. 3).

As will be explained with reference to the circuit diagram of Fig. 9, the sensing device 96 located in the non-magnetic tracer point 53′ is part of a reluctance bridge circuit which controls the pilot motor M to run in the direction required to balance the bridge circuit. Balance is maintained when the gaps between the pole ends of pole pieces 99 and 100 (Fig. 8) and the template 11 are equal, the template consisting for this purpose of steel. Under these conditions, the radial spring 71 (Figs. 3, 6) of the spring assembly is oriented perpendicularly to the tangent of the template contour at the point contacted by the tracer so that the spring assembly is properly oriented to force the tracer point against the side of the template. When the tangent of the template, during the progression of the tracer, changes its angular relation to the sensing device so that the trailing and leading gaps (Fig. 8) become unequal, the magnetic circuits passing through the pole pieces assume correspondingly different reluctance values. The inductive impedance values of the two coils 97 and 98 change accordingly so that the bridge circuit becomes unbalanced. This causes the pilot motor to turn the spring assembly in the direction and by the amount needed for restoring balance. This operation will be explained more in detail with reference to Fig. 9.

It may be added at this place that the tracer according to Figs. 3 to 5 is shown to be further equipped with an optionally applicable distributor device 107. This device has a disk 104 of insulating material which is stationarily mounted and carries a pair of contact segments on each side. Each pair of segments cooperates with a slide contact 105 or 106 for a purpose described below with reference to Fig. 14.

The control system shown in Fig. 9 is designed for controlling the pilot motor M of the tracer assembly in response to intelligence provided by a gap-sensing device as described in the foregoing. The tracer assembly for this control system may correspond to Figs. 3 to 8 except that it need not be provided with the distributor (item 107 in Figs. 3 to 5).

The control system according to Fig. 9 is energized from an alternating-current supply line 110 through transformers 111, 112, 113. The pilot motor M is exemplified as a direct-current machine. Its field winding 114 is energized through a rectifier 115 from transformer 113. The armature 116 of motor M is energized from transformer 112 through a rectifier 117 under control by two contactors 1C and 2C which, when energized, cause the motor to run in one and the other direction respectively. When the contactors 1C and 2C are both deenergized, their respective contacts 1C4 and 2C4 connect a dynamic braking resistor 118 in shunt relation to the armature 116 in order to retard and stop the motor M after each interval of operation. The contactors 1C and 2C are energized from a suitable current source 119 under control by respective relays 1CR and 2CR. These relays, in turn, are energized from a current source 120 under control by the contact 121 of a polarized relay PR. The sources 119 and 120 may consist of rectifiers connected to the supply line 110.

Figure 7:
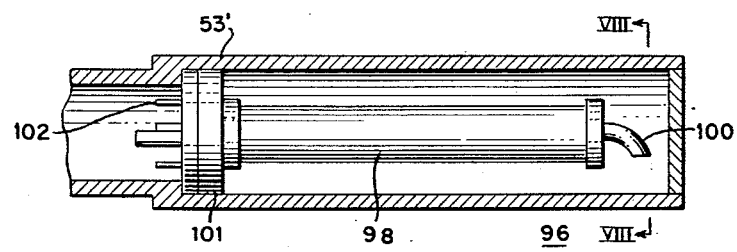
Figs. 7 and 8 are a partly sectional side view and sectional end view of a gap-sensing feeler unit that forms part of the tracer assembly shown in Figs. 3 to 5, the section of Fig. 8 being along the line VIII—VIII indicated in Fig. 7.
Figure 8:
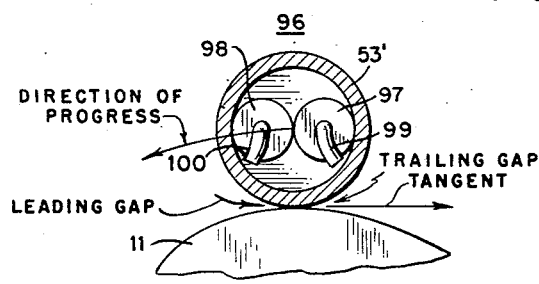

The coil of the polarized relay PR is controlled by reversible direct current from a bridge network which includes the coils 97 and 98 of the sensing device 96 (see also Figs. 7, 8). The network is energized from transformer 111 through the slide contacts 122 and 123 of respective rheostats 124 and 125. The rheostat 125 is connected across the terminals T1 and T3 (see also Fig. 3) which, as described above, are connected through slip rings 103 with the respective reluctance coils 97 and 98. The other ends of these coils are connected through further slip rings 103 and through terminals T2 and T4 across a rectifier bridge 126. The output terminals 127 and 128 of bridge 126 are connected with the coil of the polarized relay PR. The same terminals 127 and 128 are also connected to the respective ends of rheostat 124 through capacitors 130 and 129 respectively.

When the leading gap and the trailing gap between the pole pieces 100, 99 of the reluctance pick-up 96 are equal (see Fig. 8), the bridge network is balanced so that the bridge terminals 127 and 128 have the same potential. The balance condition can be properly adjusted by setting the sliders 122 and 123 to the positions in which the relay PR does not respond when the sensing device and hence the biasing-spring assembly of the tracer have the proper orientation. When during the tracing operation the two gaps at the pole pieces of the reluctance pickup become unequal, the reactance values of coils 97 and 98 in the control system of Fig. 9 become correspondingly differentiated. Consequently, the rectifier bridge 126 assumes different potentials at its input terminals so that a unidirectional voltage appears across the output terminals 127 and 128. This rectified voltage is impressed upon the polarized relay PR and causes its contact 121 to deflect in one or the other direction. The polarity of the voltage applied to the relay PR, and hence the deflecting direction of contact 121, depends upon which of the two coils 97, 98 assumes the higher impedance.

When relay PR responds, it energizes either relay 1CR or relay 2CR. This causes the corresponding contactor 1C or 2C to pick up. Regardless of which contactor becomes active, the dynamic braking resistor 118 is disconnected from the armature 116 of pilot motor M; and the motor is connected through the contacts 1C2 and 1C3 of contactor 1C, or through the contacts 2C2 and 2C3 of contactor 2C to the rectifier 117 with a polarity of connection depending upon which of the two contactors 1C, 2C has responded. The contactors are provided with interlock contacts 2C1 and 1C1 so that only one contactor is effective at a time. The running direction of motor M is such as to turn the spring assembly in the direction required to make the gaps at the pick-up equal. When this condition is reached, the control network is again balanced so that relay PR is deenergized, thus causing the relay 1CR or 2CR and the contactor 1C or 2C to drop off, whereupon the dynamic braking resistor 118 causes the motor to stop.

In this manner, the system operates continually to change the directional setting of the tracer spring assembly as the tracer travels along its entire course around the template contour.

The control system illustrated in Fig. 10 operates on the above-explained principle of controlling the tracer-spring pilot motor in dependence upon the condition-responsive behavior of the feed-screw drives of the machine. Consequently, the tracer for this control system need not be equipped with sensing devices but may be designed in accordance with Fig. 2 (or it may be designed in accordance with Figs. 3 to 5, provided the pick-up 96, slip-ring assembly 103, tubular shaft 82 and distributor 107 shown in these illustrations are omitted or not used).

The pilot motor M for controlling the directional setting of the tracer spring bias is of the split-phase capacitor type. It has two symmetrical phase windings 125, 126 placed 90° apart and is provided with a capacitor 127 which may be inserted in series with one winding or the other depending upon the direction of rotation desired. One end of each phase winding is connected to one of the motor terminals 128; and this terminal is connected to one lead L2 of an alternating-current supply line (for instance, 115 volts, 60 C. P. S.). When the motor terminal 129 is connected to the other lead L1 of the supply line, the capacitor is inserted in series with winding 126 and the motor is energized to run in one direction. When the motor terminal 130 is connected to lead L1, the capacitor 127 is series connected with the winding 125; and this results in running the motor in the opposite direction. When the capacitor 127 is short circuited while either terminal 129 or terminal 130 is connected to lead L1, both windings 125, 126 are connected across the supply lines. This causes a locked-rotor condition in the motor which serves as a brake to prevent overshooting. The motor is designed to stand this locked-rotor condition continuously. Two contactors 1C and 2C serve to energize the motor for forward and reverse run respectively; and a brake relay BC, energized under control by the contactors 1C and 2C, serves to stop the motor M.

The parts of the tracer assembly essential for operation with the control system of Fig. 10 are schematically represented at 10 by the grounded contact block B and the four quadrangularly coordinated tracer contacts DC, UC, RC, LC. These contacts are connected with "down" relay DR, "up" relay UR, "right" relay RR and "left" relay LR of the feed control system in the same manner as more fully illustrated in Fig. 2 and described in the foregoing. The four feed control relays DR, UR, RR, LR, as well as the generator G for energizing these relays, form part of a conventional milling machine and are located in the control cabinet of the machine as schematically indicated in Fig. 10 by a dot-and-dash line 124.

In the further description reference will be made, in parentheses, to magnitudes and ratings of circuit components and to type designations customary in the trade for electronic tubes. These parenthetical references are given only by way of example and, as to magnitudes, are intended to illustrate orders of magnitude rather than critical values. It should be understood that tubes of other types or components of other electrical dimensions are applicable, depending upon the circumstances of each particular use; and this applies also to all similar references given throughout this specification.

According to Fig. 10, the contactors 1C and 2C are controlled by respective gaseous discharge tubes V1 and V2 (tetrodes, type 2050) which form part of a sensing device capable of discriminating between the different conditions under which the feed control relays DR, UR, LR, RR may operate depending upon the instantaneous position of the tracer point on its travel along the template contour. The operating coil of contactor 1C lies in the plate circuit of tube V1 energized from an alternating-current supply line (for instance, 115 volts, 60 C. P. S.). A series combination of a capacitor 152 (4 mfd.) and a resistor 153 (500 ohms) is connected in parallel with the operating coil. The operating coil of contactor 2C is similarly connected in the plate circuit of tube V2 in parallel relation to a series combination of a capacitor 154 and a resistor 155. The control grids of tubes V1 and V2 are interconnected by a series of resistors 141 to 146. The midpoint of this resistance connection is connected to the negative pole of a grid-bias source 147 (12 volts). A timing capacitor C1 (1.0 mfd.) is connected between the grid resistor 141 (2 megohms) and the cathode lead L2. Another timing capacitor C2 (1.0 mfd.) is similarly connected between the grid resistor 146 (2 megohms) of tube V2 and the cathode lead L2. The capacitor C1 is shunted by the resistor 142 (1 megohm) in series with two resistors 148 and 149 (each 1 megohm) under control by the normally open contacts 1D1, 1U1 of respective relays 1D and 1U. The contacts 1D1 and 1U1 are connected parallel to each other. A similar shunt circuit across capacitor C2 includes resistors 145, 150, 151 (each 1 megohm) and two parallel-connected contacts 1R1, 1L1 of respective relays 1R and 1L.

The relays 1D, 1U, 1R and 1L have a common lead 130 connected to the generator G and have respective other leads 131 to 134 connected to the tracer contacts DC, UC, RC and LC. It will be recognized that the relays 1D, 1U, 1R and 1L are simply parallel connected to the respective feed control relays DR, UR, LR and RR. Consequently, when any one of the feed control relays is energized to control the pertaining electromagnetic clutch to produce the proper feed motion, the corresponding one of the relays 1D, 1U, 1R and 1L is likewise energized. Indeed, if desired, the relays 1D, 1U, 1R and 1L and their respective contacts may be substituted by adding corresponding contacts directly to the feed-control relays. The illustrated circuit design, however, has the advantage that no changes are necessary in the electric devices with which the conventional machines of this type are customarily equipped.

The control system of Fig. 10 operates as follows:

Assume the tracer is just starting to travel clockwise through the first quadrant (zero to three o'clock) of a convex template contour which, for simplicity, may be thought to be circular or oval. At the beginning of the tracer motion, this motion is mainly horizontal (toward the right) and has only a slight or initially negligible vertical (down) component. Accordingly, the starting moment the biasing force of the spring assembly has a predominant component directed toward the tracer contact RC and closes this contact so that the contact block B will pivot about contact RC toward contact DC. When contact RC closes, the "right" feed-control relay RR is energized from generator G and controls the corresponding magnetic clutch to operate the horizontal feed screw for movement of the tracer toward the right. At first, the contact DC closes intermittently and thus intermittently energizes the "down" relay DR which operates the feed screw for downward feed motion. Hence, at first the "right" feed motion is steady while the "down" motion is stepping.

In accordance with this normal operation in the first portion of the first quadrant of tracer progression, the relay 1R steadily closes its contact 1R1 while relay 1D, at first open, will soon commence to close intermittently, at first during very short intervals of time.

When all relays 1D, 1U, 1R, 1L are dropped off as shown, the source 147 impresses a negative bias voltage on the control grids of tubes V1 and V2 thus preventing both tubes from firing and charging the timing capacitors C1 and C2 up to full voltage.

When, as explained, the relay 1R closes its contact 1R1 steadily, it completes a discharge circuit for capacitor C2. The charge of capacitor C2 is drained off through resistors 145, 150, 151 and contact 1R1 to the cathode lead L2. Consequently, the control grid of tube V2 becomes less negative. The tube V2 fires and energizes contactor 2C. Contactor 2C picks up. Its contact 2C2 connects the brake relay BC through closed contact 1C2 of relay 1C across leads L1 and L2. Brake relay BC picks up. Its contacts BC1 and BC2 close a short circuit across the motor terminals 129 and 130, and also connect the motor windings across leads L1 and L2. The motor is now connected for locked-rotor condition.

As mentioned, during the tracer progression within the first quadrant as here under observation, the down feed is stepping. The intermittent closing of contact 1D1 in relay 1D has the effect of draining part of the charge from capacitor C1 through resistors 142, 148 and 149. However, since the individual operating intervals of the down motion are short compared to the time delay of the timing circuit of capacitor C1 and resistors 142, 148, 149, the control grid potential of tube V1 does not drop to the firing point. Consequently, tube V1 does not conduct, and contactor 1C does not pick up.

As the progressing tracer point approaches a 45° slope of the contour, the downward feed becomes more and more steady until a condition is reached where the stepping intervals of the downward feed, and hence the closing intervals of relay 1D, are long enough to cause firing of tube V1. As explained, this condition signals an incipient tendency of the tracer to run off the template. However, now the two contactors 2C and 1C are simultaneously energized. As a result, the circuit of brake relay BC is interrupted at contacts 1C2 and 2C1, and the short circuit between motor terminals 129 and 130 is removed by opening of contact BC1. The connection between motor terminal 130 and line L1 through contact BC2 is broken.

Under these conditions, phase winding 125 of the motor is connected directly across lines L2 and L1 through contacts 1C3 and 2C3. Also, phase winding 126 is connected in series with capacitor 127 and is connected directly across lines L2 and L1 through the same contacts 1C3 and 2C3. This energizes the pilot motor to rotate the tracer biasing spring in the forward direction. This obviates the tendency of the tracer to run off and sets the spring assembly for tracer motion during the subsequent part of the first quadrant. If either the vertical or horizontal feed should step, the corresponding tube will immediately extinguish causing its relay to fall out. When this happens, the motor is quickly braked by the locked-rotor condition that obtains when one relay is closed and one open. The bias voltage and integrating-circuit components are so chosen that there is no appreciable time delay in raising the grid bias voltage to cut-off once the bleeder path from the timing capacitor is open.

Toward the end of the first quadrant, the downward feed is steady while the right feed is stepping. Under these conditions, the relay 1D is steadily energized so that tube V1 is firing and contactor 1C is picked up, while tube V2 does not fire. Contactor 2C, therefore, remains dropped off. Contactor 1C now energizes the brake relay BC at contact 1C1 so that motor M is kept arrested.

It may be added that under conditions where both feed motions tend to be stepping so that there is the danger of the tracer stalling on its travel, both tubes V1 and V2 will extinguish so that both contactors 1C and 2C are deenergized. The contactors then disconnect the brake relay BC at contacts 1C1 and 2C2 and remove the short circuit between motor terminals 129 and 130 by opening contact BC1. The connection between motor terminal 130 and line L1 is broken by contact BC2; but another connection is now completed through contacts 2C4 and 1C4. This puts phase winding 126 across lines L1 and L2 and puts phase winding 125 in series with capacitor 127 across lines L1 and L2. The motor is now energized to rotate the spring assembly of the tracer in the reverse direction, thus obviating the stalling tendency. Such operating conditions may occur when tracing a concave contour.

The described operations of the control system occur continually during the tracing operation, thus frequently setting the spring bias direction as required for the tracer to perform a full cycle of travel around the template contour.

There are cases of intended use where the tracer will never operate under conditions involving the run-off tendency. This applies if the machine is to be used exclusively for the tracing and machining of interior, convex contours. The only detrimental tendency that the tracer may encounter with this particular use is the danger of stalling.

Consequently, for such a special application, the above-described timing devices are not needed and it will be sufficient to provide for instantaneous control of the pilot motor whenever the control relays signal a condition that requires a change in the setting of a tracer bias.

Figure 11:
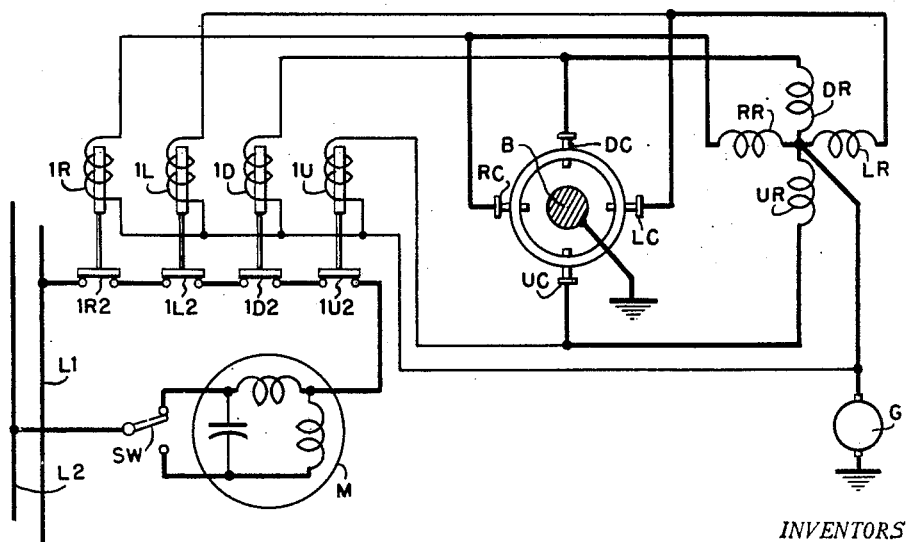
Fig. 11 is another circuit diagram of a simplified feed-responsive control system for the pilot motor, this system being applicable for special, less exacting requirements.

Such a system, in simplified form, is illustrated in Fig. 11. The pilot motor M is supposed to run in only one direction for a given tracing operation along a circular or oval contour of an opening in the work piece. As in the embodiment of Fig. 10, the control relays 1I, 1L, 1D, 1U are shown parallel connected to the feed-control relays RR, LR, DR, UR respectively, although it should be understood that the control relays may also be controlled by pressure-responsive devices such as shown in Figs. 16, 19 and described below.

Since in the system of Fig. 11 no time delay between the response of the control relays and the action of the pilot motor M is needed, the timing devices previously described can be omitted. Instead, the normally closed relay contacts 1R2, 1L2, 1D2 and 1U2 are directly series connected in the energizing circuit of the pilot motor M between the alternating-current supply leads L1 and L2.

During normal operation and as explained, at least one of the four control relays is picked up so that the motor circuit is broken and the motor at rest. When the operating conditions are such as to involve stalling tendency, all of the four relays are simultaneously closed at least for a brief interval of time. During that interval, the motor M receives a kick causing it to turn the bias spring assembly of the tracer in the reverse direction. This eliminates the danger of stalling and sets the tracer spring as needed for the further continuous progress of the tracer point along the concave contour. This play repeats itself so that the tracer follows a complete cycle of operation.

The limited applicability of such a system will be apparent. For general purposes, therefore, the more versatile control systems previously described are preferable, and these systems can be further improved to make them suitable for most reliable operation with simple as well as complicated contours of any description. Such further improved systems according to the invention will be described presently with reference to Figs. 12 to 19.

In the system of Fig. 12, the control of the spring bias pilot motor M is primarily and continuously effected by gap-sensing means and is correctively compensated by feed-responsive means.

The system as shown is energized from an alternating-current line through transformers 201, 202, 203, 204 and comprises two direct-current sources 205, 206. Transformer 201 has three secondaries 207, 208 and 211. The secondary 207 supplies plate voltage for a rectifier twin tube V3, the rectified current being supplied to an amplifier twin tube V4 that controls the grid voltages of two gaseous tubes V5, V6. Tubes V5, V6 selectively operate the contactors 1C, 2C for controlling the pilot motor M. The plate voltage for tubes V5, V6 is supplied by transformer 204. The secondary 208 of transformer 201 provides filament voltage for tubes V3, V4, V5 and V6. The secondary 211 supplies energization for a bridge network which comprises the coils 97, 98 of variable-reluctance pick-ups 99, 100 in connection with a rectifier bridge 126 with output terminals 127, 128, and in connection with capacitors 130, 129 and rheostats 124, 125. The sliders 122, 123 of respective rheostats 124, 125 are connected to the secondary 211. The circuit components 97 to 100 and 122 to 130 are identical with the components denoted by the same respective numerals in Fig. 9 and described above; and the gap-responsive, continuous sensing operation is basically similar to that already described, except that the sensing network in Fig. 14 is provided with two compensating capacitors 236, 237 which are disconnected during normal operation and become effective only under exceptional circumstances explained in a later place.

A reversible direct-current voltage appears across the rectifier terminals 127, 128 whenever the leading and trailing gaps between the respective pole pieces 100, 99 and the template 11 become unequal. This voltage is impressed through leads 212 upon the grid circuits of the twin tube V4.

The plate circuits of tube V4 are energized at terminals 215 from the rectifier tube V3 through a smoothing filter comprising a series reactor 213 and a parallel capacitor 214. The two plate circuits of tube V4 include respective voltage-drop resistors 216, 217 and a common cathode resistor 218. The two resistors 216 and 217 are series connected in a control circuit that extends through two series resistors 219, 220. A circuit point 221 between resistors 217 and 219 is connected through a resistor 224 and through a calibrating potentiometer rheostat 225 with the control grid of tube V5. This grid is normally impressed by negative bias voltage from a grid-voltage source 226 so that the tube V5 is normally nonconductive.

A circuit point 222 between resistors 216 and 220 is connected through a resistor 227 and a potentiometer rheostat 228 to the control grid of the normally nonconductive tube V6, this grid being impressed by cutoff voltage from a grid-voltage source 229.

A circuit point 223 between the resistors 219 and 220 is connected with the cathodes of tubes V5 and V6 by respective resistors 230 and 231. The plate circuits of tubes V5 and V6 are energized from transformer 204 and include the motor control contactors 1C and 2C in series connection with resistors 232 and 233 respectively.

The contactors 1C and 2C control the pilot motor M to run in one or the other direction depending upon which of the two contactors picks up at a time and connects the armature 234 of motor M to the direct-current source 205. The field winding 235 of motor M is also energized from source 205.

The operation of the motor control devices in response to the control intelligence applied by the gap-responsive sensing network to the input leads 212 of tube V4 is as follows:

When the operating conditions of the tracer are as desired so that the output voltage of the sensing network across leads 212 is zero, the two discharge paths in twin tube V4 have equal conductivities so that the voltage drops across the two plate resistors 216 and 217 are equal and cancel each other in the circuit of resistors 219 and 220. Under these conditions, both tubes V5 and V6 are biased to cutoff, this normal state being properly adjusted by the selected setting of the rheostats 225 and 228. Normally, therefore, the contactors 1C and 2C are not energized and the motor M is at rest.

When during the travel of the tracer along the template contour the two pick-up gaps become unequal so that, as explained with reference to Fig. 9, a direct-current output voltage of one or the other polarity appears across the output terminals 127, 128 of the sensing network, then the bias potentials appearing on the two control grids of tube V4 become different, and either grid may then have a higher potential than the other depending upon the polarity of the output voltage. As a result, the two discharge paths in tube V4 assume different conductivities so that the magnitudes of the voltage drops along plate resistors 216 and 217 differ from each other. This causes a differential voltage to be impressed across the series-connected resistors 220 and 219. Circuit points 221 and 222 now have different potentials, one of them being negative and the other positive relative to the circuit point 223 and hence relative to the cathodes of respective tubes V5 and V6. Consequently, the control grid in one of tubes V5, V6 is now more negative and the grid in the other tube more positive than before, so that the latter tube will fire and the corresponding contactor 1C or contactor 2C will pick up to energize the motor M. The motor then runs in the direction required to again equalize the leading and trailing gaps at the gap-sensing pick-up.

It will be recognized that, as far as the gap-responsive control of the pilot motor is concerned, the normal operation of the system is basically similar to the control effected by the contact relays described with reference to Fig. 9. This gap-responsive control is continuously effective to automatically supervise the tracing operation.

As mentioned, the sensing network of the gap-responsive pick-ups is equipped with normally inactive capacitors 236 and 237. These capacitors serve to superimpose on the continuous gap-responsive control a corrective compensation, under certain operating conditions that may cause the tracer to stall or to run off the template. Under such conditions, the compensating devices become effective to simulate in the gap-responsive sensing means a change with the effect of controlling the pilot motor to change the setting of the tracer spring bias until the danger of faulty operation has passed.

For this purpose, each of the compensating capacitors 236 and 237 is connected across a different one of the coils 97 and 98 of the pick-up device under control by the contracts 1CR1, 2CR1 and 1CR2 of two control relays 1CR and 2CR. A two-position selector switch SW1 is interposed between the capacitors 236, 237 and the coils 97, 98 for connecting each capacitor to one or the other coil depending upon whether the control system is to be set for climb milling or conventional milling. The coils of relays 1CR and 2CR are series connected in the plate circuits of respective tubes V1 and V2 energized from transformer 202. These tubes, as regards performance and control, correspond essentially to the tubes V1 and V2 in the system of Fig. 10. That is, these tubes have control grids connected to integrating or timing circuits to operate as feed-responsive sensing devices.

The circuit connected to the control grid of tube V1 comprises resistors 241, 242, 243 and has a timing capacitor C1 connected between the grid resistor 241 and the common cathode lead of tubes V1, V2. The grid circuit extends from resistor 242 to ground under control by the contact HR1 of a relay HR. One side of the operating coil of relay HR is connected to the direct-current source G which consists of a generator that forms part of the milling-machine system. The other side of the operating coil of relay HR is connected to the rotatable contact arm 105 of a distributor device that forms part of a tracer assembly as shown in Fig. 3. The purpose of the distributor device is to eliminate two of the four control relays (1D, 1U, 1R, 1L) previously described. That is, in the system of Fig. 12 only two control relays, namely HR for horizontal control and VR for vertical control, are used. The contact arm 105 of distributor 107 co-operates with two slide contacts or sectors RS and LS which are insulated from each other, each having a substantially semi-circular shape. Depending upon the angular position of the arm 105 and hence upon the direction of the spring bias in the tracer assembly (see the description of Fig. 3), arm 105 engages either the sector RS or the sector LS, thus continuing the coil circuit of relay HR to a two-position selector switch SW2 which connects the sectors RS and LS to respective control contacts RC and LC, or to respective contacts LC and RC, depending upon whether the switch SW2 is set for climb milling or conventional milling. Rotatable together with the arm 105 in distributor 107 is a second contact arm 106 cooperating with two slide sectors DS and US also of semi-circular shape and insulated from each other but oriented in a perpendicular relation to the pair of sectors RS and LS.

Tube V2 has its control grid connected to a circuit comprising resistors 247, 248, 249 and a timing capacitor C2. The grid circuit of tube V2 is connected to ground under control by the contact VR1 of relay VR. The coil of relay VR is connected between the current source G and the contact arm 106 which engages either the sector DS or the sector US. These sectors are connected with switch SW2 which connects the two sectors to contacts DC and UC, or UC and DC, respectively, depending upon whether the switch is set for climb milling or conventional milling.

Assume that both selector switches SW1 and SW2 are set for climb milling and that the lever 83 (see Fig. 4) is also in the climb-milling position. Assume further that the tracer is starting to travel clockwise through the first quadrant (zero to three o'clock) of a convex contour portion of the template. Then the bias force of the spring assembly is automatically so directed that the tracer contact RC is closed and energizes the "right" feed-control relay RR to operate the horizontal tool-and-tracer feed for movement of the tracer toward the right. At first, the tracer contact DC closes intermittently and correspondingly energizes the "down" relay DR for downward feed motion. That is, at first the horizontal (right) feed motion is steady and the vertical (down) feed motion is stepping.

During this operation, the tracer contacts RC and DC also control the compensating devices. As long as the bias-spring assembly is in the angular position needed to impose on the contact block B the properly directed force for clockwise progression of the tracer through the first quadrant of the convex contour, the distributor 107, joined with the tracer spring assembly, has its two contact arms 105, 106 in engagement with the respective segments RS and DS. Consequently, when contact RC, at the beginning of the clockwise progression, is steadily engaged by the contact block B, it closes a circuit from ground through B—RC—SW2—RS—105—HR—G. Relay contact HR1 closes and grounds the timing capacitor C1 (0.5 mfd.) in the grid circuit of tube V1. The charge of capacitor C1 is drained off to ground through the high-ohmic resistor 242 (3 megohms) so that the control grid of tube V1 becomes less negative and the tube fires. Relay 1CR picks up. Its contact 1CR2 disconnects the compensating capacitor 237 from reluctance winding 98 and the contact 1CR1 prepares a circuit for capacitor 236. Capacitor 236, however, remains disconnected from reluctance coil 97 at contact 2CR1 of relay 2CR, because relay 2CR cannot pick up under the conditions here in view as the tube V2 remains non-conductive for the following reason.

Whenever the tracer contact DC closes intermittently, relay VR applies ground potential to the timing capacitor C2 (0.5 mfd.) in the grid circuit of tube V2 through resistor 248 and relay contact VR1. However, the time delay of the timing circuit comprising capacitor C2 and resistor 248 is so long, relative to the stepping intervals of the vertical (down) tracer feed, that the control grid potentials of tube V2 does not reach the firing point. Consequently, relay 2CR does not pick up, and its normally open contact 2CR1 keeps the compensating capacitor C2 disconnected from reluctance winding 97.

As a rule, therefore, the compensating devices are ineffective and the tracer bias-spring adjustment is normally under control by the gap-sensing devices only.

Now assume that, while the tracer is traveling in the first quadrant as described, it approaches a 45° slope. Then a point will be reached where the stepping periods of the vertical (down) motion become long enough to trip the tube V2. At that moment, both tubes V1 and V2 are firing. Relay 2CR picks up, and its normally open contact 2CR1 connects the compensating capacitor 236 across the pick-up coil 97. This reduces the impedance of the network so that more current flows through coil 97, thus simulating a smaller trailing gap. This unbalances the sensing network and the pilot motor M corrects the simulated error by turning the spring assembly and the gap-sensing pick-ups in the direction of tracer progression (clockwise) until a new balance is obtained with a longer gap between the trailing pole piece 99 and the template, and a shorter gap at the leading pole piece 100. This new position increases the radial component of spring tension and decreases the tangential component of spring tension relative to the tracer point. In this way, the compensating devices prevent the tracer from leaving the template whenever the machine acts as if the tracer was approaching a 45° slope on the template.

After the tracer has passed through the critical zone of travel in which both feed motions may be steady, a point will be reached where the vertical (down) motion is steady while the horizontal (right) feed motion is stepping at progressively shorter intervals so that timing capacitor C1 in the grid circuit of tube V1 is no longer sufficiently drained of its charge to keep the tube V1 firing. Tube V1 stops conducting, and relay 1CR drops off. The normally open contact 1CR1 disconnects capacitor 236 from pick-up coil 97. Now the compensating circuit is again inactive while the tracer passes through the rest of its travel in the first quadrant with a steady vertical (down) component and a stepping and declining horizontal (right) component of travel.

The compensating devices may also respond to irregularity in gap-responsive control other than the one considered in the example of conditions just described. For instance, should the horizontal feed motion, during the initial tracing period in the first quadrant, be abnormal, that is, stepping rather than steady, the tube V1 would not fire because its timing capacitor C1 would not sufficiently discharge, and the compensating capacitor 237 would then be connected across coil 98 through contacts 1CR2 and 2CR2 to modify the control of motor M toward the directional change in spring bias needed to make the horizontal feed steady.

The time for the grid bias voltage of tubes V1 and V2 to rise sufficiently for preventing the tube from firing is short, compared with the time required for the bias voltage to decay from full bias to the firing point. This is advantageous because it causes the relays 1CR and 2CR to drop off quickly if there is any hesitancy in the feeds which may precede stalling. When both feeds hesitate, both relays 1CR and 2CR are dropped off and connect the capacitor 237 across the leading coil 98 of the gap-sensing device. This unbalances the bridge network and causes the pilot motor M to rotate the spring assembly and the sensing device in the direction (counterclockwise) opposed to the tracer progression. A new balance position will thus be obtained with a longer gap at the leading pole piece 100 and a shorter gap at the trailing pole piece 99. This new position increases the tangential component. In this way, the compensator acts to keep the tracer progressing around the template whenever there is danger of stalling.

After the tracer passes from the first into the second quadrant (three to six o'clock) of a clockwise progression, the arm 105 of distributor 107 connects the coil circuit of relay HR with segment LS and tracer contact LC, while the coil circuit of relay VR remains connected through distributor arm 106 and segment DS with tracer contact DC. Since now the progressing tracer motion has initially a large vertical (down) component and a small horizontal (left) component, feed control relay DR is continuously energized and feed control relay LR is stepping so that the tube V2 conducts and tube V1 is nonconductive.

In this manner, the distributor 107 takes care of connecting the relays HR and VR in each quadrant and for any angular position of the tracer spring assembly to those tracer contacts (DC, UC, RC, LC) and those feed-control relays (DR, UR, RR, LR) that are then required to operate for properly controlling the compensating devices.

It will be recognized that this functioning of distributor 107 (Figs. 14, 3) is essentially equivalent to the selective performance of the control relays 1D, 1U, 1R, 1L shown in Figs. 10, 11 (and also in Figs. 13, 14 and 15) and described in conjunction with these other illustrations. Whether for any intended application the provision of a distributor is preferable, or whether instead a group of discriminating relay connections is to be used, depends only upon questions of economy and space requirements. As far as the basic operations are concerned, both types of discriminating devices are applicable for the purposes of our invention, and both have the advantage of not requiring any change in the electric equipment with which the contour milling machines are usually equipped.

It appears proper at this place to mention that a third alternative possibility of feed discriminating devices is available that may be used instead of the distributor (107 in Figs. 3, 12) and instead of the feed-responsive control relays (1D, 1U, 1R, 1L in Figs. 10, 11). This possibility consists in providing the feed control relays DR, UR, RR, LR with additional contacts that take the place of the contacts 1D1, 1U1, 1R1, 1L1 (Figs. 10, 11). A modification of this type will be described below with reference to Fig. 13. It requires a minor change in the feed control relays usually forming part of the conventional control equipment of such machines but results in a simplification that may favorably be used, especially when the invention is to be applied to new machines.

According to Fig. 12, the grid circuits of tubes V1 and V2 are provided with auxiliary capacitors C3 and C4 (each 0.25 mfd.) across respective resistors 242 and 248 to prevent a dip in the negative bias in one grid which might trigger that tube when the current through the inductive load (relay coil 1CR or 2CR) of the other tube changes.

It will be understood from the foregoing that the gap-responsive control and the feed-responsive control co-acting with each other in a system of this type shown in Fig. 12 are inherently capable of independent performance. Assume, for instance, that capacitors 236 and 237 are disconnected. Then the feed-responsive compensation is ineffective and the pilot motor M is controlled only by the gap-responsive pick-up devices. The control is then substantially similar to the operation of a system according to Fig. 9. Such a spring-bias control is relatively smooth and may suffice for certain types of work, particularly convex contours of fairly regular shape. On the other hand, when the capacitors 236 and 237 are connected into the circuit, but when the pick-ups are kept removed from the template or are replaced by constant impedances in the sensing network, then the pilot motor M is controlled only by the feed-responsive means in the same manner as in the system of Fig. 10. Such a control, though capable of operating alone, is relatively coarse because it responds to the occurrence of given limit conditions rather than to a continuously variable magnitude. The conjoint and simultaneous operation of the two controls, therefore, has the effect of providing a fine control in response to gap-sensing complemented by a relatively coarse control in response to feed condition, with the result of securing an accurate and reliable tracing operation around the entire template regardless of any irregularities in contour shape.

The control system shown in Fig. 13 is equipped with a gap-sensing device for normally and continuously controlling the pilot motor of the tracer spring assembly, and is further provided with feed-responsive sensing devices for superimposing a corrective compensation.

The system combines features of Figs. 9 and 12 with further improvements and refinements. Since, as regards the gap-responsive control operation and feed-responsive compensation, the system has much the same performance as the preceding embodiments, the following description is limited to those features that distinguish the system from those previously described. For comparison, the elements of the system in Fig. 13 are denoted by the same reference characters as applied in Figs. 9 and 12 to functionally similar elements respectively.

It may be mentioned that Figs. 13 to 15 are drawn as straight-line diagrams substantially in the manner of engineering drawings customary in industry. That is, the coils of the relays are shown separate from the relay contacts controlled by these coils; and the interrelation of each coil to its relay contacts is made apparent by designating the relay contacts with the same reference characters plus a numerical affix. For instance, relay 3CR in Fig. 13 has a normally open contact 3CR1 and a normally closed contact 3CR2. When relay 3CR picks up, contact 3CR1 closes and contact 3CR2 opens.

The gap-sensing device (97 to 100) in Fig. 13 is connected with a bridge network 126 to 130 for controlling, through a polarized relay PR, the contactors 1C and 2C of the motor controls 177". This portion of the system corresponds to Fig. 12 with the exceptions described presently.

The motor controls 177" comprise two normally closed contacts 1C1, 1C2 in contactor 1C, and two normally closed contacts 2C1, 2C2 in contactor 2C. When the direction of the spring bias in the tracer is correct for any particular moment or point of tracer progression along the template, the polarized relay PR is deenergized and both contactors 1C and 2C are dropped off. Under these conditions, the contacts 1C1 and 2C1 connect the motor field windings across the alternating-current supply leads L1 and L2, and the contacts 1C2 and 2C2 close a short circuit across the capacitor 127 of the split-phase motor M. Thus connected, the motor M is in locked-rotor condition, and the spring assembly remains at rest. When contactor 1C picks up under control by the gap-sensing equipment, its contact 1C2 breaks the short circuit across capacitor 127 while contact 1C1 disconnects one of the two field windings of the motor from lead L1. The other field winding of motor M remains energized through contact 2C1 so that the motor runs in the direction required to change the direction of the tracer spring bias as needed for maintaining this bias properly oriented.

When the response of the gap-sensing device is such as to energize the contactor 2C, the contact 2C2 breaks the short circuit across capacitor 127, and contact 1C1 energizes the motor M to run in the other direction.

The contacts of the polarized relay PR are bridged by respective push-button switches 261 and 262 for manual control of the contactors 1C and 2C. This permits operating the pilot motor M for setting the spring bias to any direction that may be initially desired when the machine is being prepared for operation.

The gap-responsive sensing network, including the coils 97 and 98 of the variable-reluctance pick-up, is provided with a rheostat 267 which permits adjusting the sensitivity of the network to any desired value within given limits. The network is further equipped with a rheostat 263 and associated resistors 264, 265, 266. The rheostat 263, in conjunction with resistor 264, permits setting the balanceable network to the proper balance or zero condition and thus serves substantially the same purpose as the rheostats 124 and 125 in Figs. 9 and 12.

The compensating capacitors 236 and 237, controlled by relay contacts 1CR1, 2CR1 and 1CR2, 2CR2 in the same manner as in the system of Fig. 12, are connected to the rectifier bridge 126 of the sensing network through a reversing switch 270. The switch 270 permits placing each of capacitors 236 and 237 across either coil 97 or coil 98. With one setting of switch 270, the sensing network is set for clockwise progression of the tracer (climb milling), and with the other setting of switch 270, the network is set for counterclockwise progression (conventional milling), thus making the system readily adaptable to either kind of application. It may be added that the system is preferably used with a tracer assembly as shown in Figs. 3 to 8, and that when changing the setting of switch 270 (Fig. 13), the setting of the tracer spring is likewise to be changed by shifting the lever 83 (Figs. 1, 3, 6) as explained above.

The compensating equipment of the system (Fig. 13), comprising the gaseous discharge tubes V1, V2 with their respective grid circuits, operates in a manner basically similar to the performance of the compensator described with reference to Fig. 12, except that the distributor 107 in Fig. 12 is replaced in Fig. 13 by contacts DR1, UR1, RR1, LR1 that form part of the otherwise conventional feed-control relays DR, UR, RR, LR respectively. As mentioned, such a relay connection secures the same discriminating performance as the distributor mechanism 107 (Fig. 12) or the parallel relays 1D, 1V, 1R, 1L (Figs. 10, 11) so that the contactors 1CR and 2CR will selectively operate to connect the compensating capacitors 236 and 237 across the proper pickup coils 97, 98 only when the tracing operation encounters a condition not properly coped with by the normally effective gap-responsive control.

The compensating equipment of the system shown in Fig. 13 is further modified by the addition of a control relay 3CR which is connected across the leads L1 and L2 of the alternating-current supply under control by normally-closed contacts 1CR3, 2CR3 of respective control relays 1CR and 2CR.

As explained, either one of the two control relays 1CR, 2CR is steadily energized whenever the operating conditions of the tracer are normal. Consequently, either contact 1CR3 or contact 2CR3 is open, thus disconnecting the relay 3CR from the line. However, should the tracing operation encounter a condition where both tubes V1 and V2 become non-conductive so that both control relays 1CR and 2CR will be dropped off simultaneously, then the relay 3CR will pick up and will close its contact 3CR1 while opening its contact 3CR2. As a result, an auxiliary capacitor C5 (0.5 mfd.) is parallel connected to the timing capacitor C1 (0.5 mfd.), thereby changing the time delay of the timing circuit for tube V1.

The capacitor C5 is added to the time delay circuit of one tube only, to prevent both tubes V1, V2 from firing at the same time (thus applying compensation in one direction) too soon after both tubes have been cut off (and have applied compensation in the other direction). If the compensation were applied in one direction and then suddenly applied in the opposite direction, the sequence may produce large swings of the tracer spring assembly and the gap-sensing device while the motor M is seeking to obtain a new balance position. This could produce hunting and could affect the quality of the work. However, since capacitor C5, fully charged by negative bias voltage, is connected parallel to the timing capacitor C1 of tube V1 each time there is a call for tangential compensation, the capacitor C1 is supplied with additional negative charge which temporarily prevents tube V1 from firing again until the charge has drained off.

The system illustrated in Fig. 14 operates to continuously control the tracer-spring adjusting motor by gap-responsive sensing means and superimposes upon this control a corrective compensation in response to feed conditions.

The system is energized from an alternating-current line by a transformer 301 with four secondary windings 302, 303, 304, 305. The alternating-current pilot motor M has two field windings 306, 307. Winding 306 is connected in series with a phase-shift capacitor 308 to the secondary 305. Field winding 307 of motor M is energized from the output terminals 309 of an amplifier 310 controlled by intelligence from a gap-sensing device through an input transformer 311.

The gap-sensing device comprises variable-reluctance pick-ups 97 to 100 similar to the pick-ups shown in Figs. 9, 12 and 13. The pick-up coils 97 and 98 are connected in a balanceable bridge network energized from the secondary 302 through a switch 312 and through two potentiometer rheostats 124, 125 with respective slide contacts 122, 123. The rheostat 124 is paralleled by two series-connected rheostats 313, 314 whose common midpoint is connected with the slider 122. A calibrating rheostat 315 is series connected between rheostat 124 and one of the pick-up coils (98). A resistor 316 is connected across the rheostat 125, and a calibrating rheostat 317 is series connected between resistor 316 and one of the two capacitors 129 and 130 of the network.

In distinction from the balanceable network of the gap-sensing devices according to Figs. 9 and 12, the network in Fig. 14 is not provided with a rectifier bridge so that the output voltage impressed upon the input transformer 311 of the amplifier 310 is alternating. When the network is balanced, the alternating output voltage at transformer 311 is substantially zero. When the network is unbalanced in one or the other sense due to the gap-responsive change in impedance of the pick-up coils 98 and 99, the output voltage assumes a finite value whose phase depends upon the direction of the unbalance. That is, when the network is unbalanced in one sense, the output voltage impressed upon transformer 311 has a phase difference of 180° from the output voltage obtaining when the network is unbalanced in the opposite sense. As will be explained, the amplifier 310 operates to amplify the input signal while maintaining the just-mentioned phase relation, thus energizing the field winding 307 of motor M either in phase with the voltage applied to the other field winding 306 or in phase-opposition thereto. Consequently, when the input intelligence has a sufficient magnitude, the motor M will run in one or the other direction as required for setting the spring bias in the tracer assembly to the direction required for the proper progression of the tracer along the template.

Instead of providing for corrective compensation by means of relay-controlled capacitors (236, 237) as used in the systems of Figs. 9 and 12, the compensation in the system of Fig. 14 is effected by selectively shorting a tapped-off portion of rheostat 313 or 314. The effect is basically the same as described in conjunction with the embodiments of Figs. 9 and 12; that is, the corrective compensation is produced by unbalancing the bridge network in one or the other sense to thereby simulate a change in gap spacing that will cause the motor M to seek a new balance position at which the incipient tendency of faulty tracing operation is obviated.

The slide contacts of rheostats 313 and 314 are connected through a reversing switch 270 and through a switch 272 with the slider 122 under control by relay contacts 1CR1, 2CR1 and 1CR2, 2CR2. The switch 270 permits setting the system for clockwise progression of the tracer (climb milling) or counterclockwise progression (conventional milling) as explained with reference to the corresponding switch 270 in Fig. 13. The switch 272 permits disconnecting the compensator from the network so that the gap sensing device can be used without compensating action if desired.

The relay contacts 1CR1 and 1CR2 form part of a control relay 1CR which is energized under control by a gaseous discharge tube V1. The contacts 2CR1 and 2CR2 form part of a control relay 2CR which is energized under control by a gaseous discharge tube V2.

The control relays 1L, 1D, 1R and 1U correspond essentially to the correspondingly denoted relays described in the foregoing with reference to Fig. 10. That is, these relays in Fig. 14 also cooperate with timing circuits that comprise two gaseous discharge tubes V1 and V2. The timing circuits are connected with the control grids of the tubes and are composed of resistors 141 to 146, 148 to 151 and capacitors C1, C2 exactly corresponding to the circuit components denoted by the same respective reference characters in Fig. 10. It, therefore, is unnecessary to again describe the operation of these circuits, with the exception of the modifications and improvements mentioned presently.

The source of grid-bias voltage for tubes V1, V2 consists of a rectifier 147a energized from the secondary 303 of transformer 301.

The two resistors 142 (1 megohm) and 143 (4.9 megohms) in the timing circuit of capacitor C1 (1 mfd.) and resistors 148 (3 megohms) and 149 (.027 megohm) are shunted by a resistor 175 (0.5 megohm) under control by normally closed contacts 1D2 and 1U2 of respective relays 1D and 1U. Similarly, the resistors 144 and 145 in the timing circuit for tube V2 are shunted by a resistor 176 under control by series-connected and normally closed contacts 1R2 and 1L2 of respective relays 1R and 1L.

The shunt circuit of resistor 175 and contacts 1D2, 1U2 serves to quickly reset the timing interval of tube V1 each time relays 1D and 1U drop off. This insures a time delay before tube V1 can fire again and prevents an undesired rapid on-off action of tube V1. It also insures a rapid cut-off of tube V1 before the vertical feed hesitates. In a like manner, the shunt circuit of resistor 176 and contacts 1R2 and 1L2 serves to quickly reset the timing interval of tube V2 each time relay 1R and 1L are deenergized. This insures a time delay before tube V2 can fire again and also a rapid cut-off of tube V2 before the horizontal feed hesitates.

One of the advantages of this circuit is that it control the pilot motor to apply a corrective action definitely before a stalling condition occurs. As explained, both component feed motions tend to be stepping. Under these conditions, the two series-connected relay contacts 1D2 and 1U2, or 1R2 and 1L2, will be closed simultaneously. When that happens, the resistor 175 or 176 is parallel connected to the resistors 143, 142 or 144, 145, thus instantly reducing the electric resistance between the grid voltage source 177 and the control grids of tubes V1 and V2. As a result, the negative grid voltage, which otherwise would rise to the quenching potential rather slowly, is abruptly forced up so that the tube will quench immediately. This causes the pilot motor to instantly correct the spring bias direction in the tracer, thus obviating the stalling tendency.

In summary, when both component feeds tend to be steady, the control system provides for time delay in the tube circuits that causes forward rotation of the pilot motor thus applying an anticipatory correction before the tracer can leave the template; and when both component feeds tend to be stepping, the control system provides for undelayed response in the tube circuits to cause reverse rotation of the pilot motor, thus applying an anticipatory correction before the tracer can stall.

The amplifier 310 as such is available on the market as a commercial unit. For that reason, the following brief description of its essential components and operation appears sufficient.

The amplifier 310 is energized through a transformer 331 connected to the secondary winding 305 of the main transformer 301. Transformer 331 has four secondary windings 332, 333, 334, 335 serving to energize four double triodes V7, V8, V9 and V10. The filament circuits of these four tubes are energized from secondary 332. The three secondaries 333, 334, 335 supply various plate voltages to tubes V8, V9 and V10.

The input signal from transformer 311 is applied across the cathode lead 341 and the grid 342 in the first stage of tube V7. The amplified output voltage of the first stage is impressed through a capacitor 343 on the grid 344 of the second amplifying stage also contained in tube V7. The amplified output voltage of the second stage is applied through a capacitor 345 and a gain-control rheostat 346 to the grid 347 of the tube V8, this grid forming part of the third amplifying stage. The other half of the twin tube V8 has its grid and cathode connected with each other and forms a rectifier which is energized from the transformer winding 333 and supplies plate voltage to the above-mentioned three amplifying stages.

The output voltage of the third amplifying stage (first portion of tube V8) is applied to the four grids 369, 370, 371, 372 of tubes V9 and V10. All four discharge paths of tubes V9 and V10 are parallel connected and are energized from the secondaries 334, 335 of transformer 331 so that the tubes V9 and V10 operate together as a single-stage power amplifier. The output of the power amplifier, across the cathode lead 374 and the anode 375, is supplied through terminals 309 to the winding 307 of motor M as described previously.

When a "positive" signal voltage (that is, a voltage corresponding to unbalance of the sensing network in one direction) is impressed upon the input transformer 311 of the amplifier 310, the amplified voltage applied to the motor winding 307 lags by 90° the voltage impressed upon the motor winding 306. The proper in-phase relation can be secured by means of the phase correction capacitor 308 in the circuit of winding 306 and by means of another phase correction capacitor 376 connected with the circuit of winding 307.

When the signal is "negative" (that is, caused by unbalance of the sensing network in the opposite direction), the output voltage of the amplifier impressed upon the field winding 307 of motor M leads by 90° the voltage of winding 306.

Consequently, the motor will run in one or the other direction depending upon the unbalance condition of the sensing network.

When there is no signal, only a residual direct current may flow through winding 307. This current can be checked by an instrument 381 under control by a push-button switch 382. Before starting the operation of the machine, the network of the sensing device should be calibrated by means of the rheostats 124, 125, 315, 317 so that the residual current is negligible and the motor at rest. Under these conditions, the motor is kept in locked-rotor condition.

It will be understood from the foregoing that the gap-responsive control and the feed-responsive control in a system according to Fig. 14, though individually capable of controlling the pilot motor M, favorably complement each other in securing a spring-bias adjustment that combines a sensitive response to continuous gap-sensing with a coarser response to feed conditions.

In the control system illustrated in Fig. 15, the spring-bias directing motor M of the tracer assembly is normally controlled in response to the tool-feed conditions of the machine, and is also subject to corrective control in response to the variations in contact pressure at the tracer control contacts.

The control contacts DC, UC, RC and LC of the tracer assembly are each designed as a pressure-responsive device. One of these devices is separately illustrated in Fig. 16 and described presently.

According to Fig. 16, the contact device comprises a contact pin 401 to be electrically contacted by the grounded contact block B of the tracer spindle. The pin 401 is slidably guided in a cylindrical capsule 402 of metal which is firmly secured in a bore of the tracer sleeve. Two insulating washers 403a and 403b keep the capsule 402 in spaced and insulated position relative to the tracer sleeve. Metal washers 404 are placed on top of the insulating washer 403b, and a clamping nut 405 firmly secures the assembly to the tracer sleeve. The contact washer 406 is firmly pressed against the nut 405 by means of a lock nut 407. A metal sleeve, composed of two parts 408a, 408b tightly screwed against each other, is placed upon a threaded portion of the contact pin 401. The sleeve secures a proper sliding fit between the pin and the capsule 402 and permits adjusting the initial gap between block B and pin 401. A nut 409, screwed into the top portion of the capsule 402, serves as an abutment for a helical spring 410 that surrounds the pin 401 and has its other end bear against the sleeve part 408b, thus biasing the contact pin 401 toward the block B.

An extension sleeve 411 is screwed upon the upper end of capsule 402 and is firmly secured in position by a lock nut 412'. An insulating insert 412 is screwed into the top of the sleeve 411 and carries a screw bolt 413 whose end forms a contact 414. The bolt 413 is secured in properly adjusted position by means of a nut 415 that serves also for attaching an electric lead 416 to the bolt 413. Another lead 417 is electrically connected with the capsule 402 and hence also with the contact pin 401. The lead 417 may be attached to the contact washer 406, although it may instead be connected with part 411 or 412'. The leads 416 and 417 are also identified in Fig. 15 for the contact device DC.

Referring to Fig. 15, it will be seen that as soon as the contact block B of the tracer spindle engages the contact pin 401, a ground connection is established between block B and lead 417 (see Fig. 16). Shortly thereafter, a contact is closed between the pin 401 and the contact 414, thus also establishing a grounded connection between contact block B and lead 416. When the contact pressure between block B and contact pin 401 declines, a point will be reached where the engagement between contact pin 401 and contact 414 is interrupted while the contact block B is still in electric connection with pin 401 and hence with lead 417. In other words, the contact between pin 401 and contact 414 is interrupted prior to any interruption that may thereafter occur between block B and contact pin 401. The purpose of this anticipating action at contact 414 will be explained below.

Referring to Fig. 15, the contact pin 401 and the capsule 402 of contact device DC are connected by the lead 417 with the "down" feed-control relay DR of the machine tool. The same parts of contact device DC are also connected with a control relay 1D. This relay is energized from the source G in parallel relation to the feed control relay DR. Consequently, whenever the contact block B engages the contact pin 401 of contact device DC, the feed control relay DR and the corresponding control relay 1D will operate simultaneously.

Similarly, the contact pins 401 of the tracer contacts UC, RC and LC are connected to the respective feed-control relays UR, RR and LR of the machine as well as to the parallel connected control relays 1U, 1R and 1L respectively. The control relays 1D, 1U, 1R and 1L have respective normally open contacts 1D1, 1U1, 1R1 and 1L1 for controlling the timing circuits connected to the control grids of two gaseous discharge tubes V1 and V2 more fully described in a later place.

The control system of Fig. 15 is energized from a supply line (115 volts, 60 C. P. S.) through three transformers 421, 422, 423. The transformer 421 is essentially an isolating transformer and may have a secondary voltage (115 volts) equal to the primary voltage. This transformer supplies energization through leads L1 and L2 for the pilot motor M. The transformer 422 (12 volts secondary voltage) energizes a rectifier 147a which supplies grid voltage for the tubes V1, V2 and for an additional control tube V11 also of the gaseous type (all tetrodes type 2050). The transformer 423 (6 volts secondary voltage) supplies filament current for the three tubes.

The motor M is of the split-phase capacitor type as described with reference to Fig. 13, and is controlled by the contacts 1C1, 1C2 of a contactor 1C, and the contacts 2C1, 2C2 of a contactor 2C to run in one or the other direction depending upon which of the two contactors is energized at a time. Normally, that is when leads L1 and L2 are under voltage and both contactors 1C, 2C are dropped off, the capacitor 127 in the motor circuit is shorted by the normally closed contacts 1C2 and 2C2, and the motor windings are then excited to hold the motor arrested in locked-rotor condition. When contactor 1C picks up, the short circuit across capacitor 127 is broken by contact 1C2 and the contact 1C1 is opened so that the motor receives excitation through contact 2C1 to run in the forward direction. When the contactor 2C is energized, the capacitor short circuit is broken at contact 2C2 and the contact 2C1 is opened so that the motor is energized through normally closed contact 1C1 to run in the reverse direction.

The contactors 1C and 2C are energized between leads L1 and L2 under control by the contacts 1CR1, 1CR2 of a relay 1CR, and the contacts 2CR1 and 2CR2 of a relay 2CR. The connection also includes a reversing switch 270 which permits setting the system for either climb milling or conventional milling as explained previously. A switch 424 permits setting the system for automatic or manual operation. Regardless of whether the switch 424 is open or closed, the contactor 1C can be manually energized by depressing a push-button switch 425; and the contactor 2C can be manually energized by depressing a push-button switch 426. In this manner, the motor M and hence the bias direction of the tracer-spring assembly can be set to any desired position.

When relay 1CR picks up, while relay 2CR remains dropped out, neither contactor 1C nor contactor 2C is energized because the contacts 1CR2 and 2CR1 are then both open. When relay 2CR is energized and relay 1CR deenergized, there is likewise no operation of the contactors 1C and 2C because now the contacts 1CR1 and 2CR2 are both open. As will be explained, only one of the two relays 1CR, 2CR is energized at a time as long as the tracing operation is normal. Consequently, the motor M is normally at rest in locked-rotor condition.

However, when both relays 1CR and 2CR are energized simultaneously, the contacts 1CR1 and 2CR1 are both closed and the contacts 1CR2 and 2CR2 are both open. Under these conditions, the contactor 1C is energized and the motor M will run in the forward direction. On the other hand, when both relays 1CR and 2CR are deenergized, the contacts 1CR2 and 2CR2 are both closed and the contacts 1CR1 and 2CR1 are both open as illustrated. Under these conditions, the contractor 2C is energized and causes the motor to run in the reverse direction. These operations take place whenever the tracing operation approaches a condition where the tracer may run off the template or where the tracer may stall. The operation of the motor in the forward or reverse direction then changes the spring-bias direction to obviate the tendency of error.

Relays 1CR and 2CR are connected in the plate circuits of the above-mentioned tubes V1 and V2. These tubes have their control grids connected with respective timing circuits designed and operative in the same manner as explained above with reference to Fig. 14. The reference characters applied in Fig. 15 to the circuits of tubes V1 and V2 are identical with those used for the respective components in Fig. 14 so that it is unnecessary to repeat the description of these circuits.

Assume the tracer starts travelling from zero to three o'clock in the first quadrant of a clockwise progression so that at first the contact block B will steadily engage the contact pin 401 of tracer contact RC and will intermittently engage the contact pin 401 of tracer contact DC. Then the relay 1R is steadily energized, and the relay 1D is intermittently energized. Consequently, contact 1R1 is steadily closed, while contact 1D1 closes intermittently. Contact 1R1 drains the charge of capacitor C2 so that tube V2 fires and energizes the relay 2CR. The intermittent operation of contact 1D1 is not sufficient to drain the capacitor C1 sufficiently for firing the tube V1 so that relay 1CR remains deenergized. Under these conditions, neither contactor 1C nor contactor 2C will pick up so that the motor M remains arrested as explained above. When the closing periods of contact 1D1 become long enough to fire the tube V1, both relays 1CR and 2CR may be energized simultaneously. Then the contactor 1C is energized to make the motor M run in the forward direction to adjust the tracer spring as needed to overcome the danger of the tracer running off the template. When thereafter the tracer passes beyond the 45° position and the contact 1D1 is steadily closed while the contact 1R1 operates intermittently, only the tube V1 will fire so that relay 1CR is energized and relay 2CR is deenergized. When this condition is reached, the motor M is again at rest because neither contactor 1C nor 2C is picked up.

It is assumed in the foregoing that, during normal operation, the two tubes V1 and V2 receive plate voltage from transformer 421. This requires the relay contact 4CR1, connecting the tubes V1 and V2 with the plate-voltage supply, to be closed whenever the operating conditions are normal. The contact 4CR1 forms part of a relay 4CR whose coil is connected in the plate circuit of the tube V11. The coil 4CR is paralleled by a capacitor 431 in series with a resistor 432 to prevent chattering of the relay. In this respect, the capacitor 431 and the resistor 432 serve the same purpose as the components 152, 153 and 154, 155 in the circuits of tubes V1 and V2. The control grid of tube V11 is connected through resistors 433 (1 megohm) and 444 (4 megohms) with the secondary of transformer 422. A resistor 445 (3 megohms) is connected between resistors 443, 444 and the cathode lead of the tube V11. Due to this connection, the control grid of tube V11 is normally impressed by a negative cut-off voltage so that the tube will not fire.

However, a lead 446 connects a common terminal point of resistors 433, 444 and 445 with all four contacts 414 of the tracer assembly through respective resistors 447, 448, 449 and 450 (0.47 megohm each). Consequently, when in any one of the contact devices DC, UC, RC, LC the contact pin 401 engages the contact 414, the control grid of tube V11 is connected through resistor 433, lead 446, one of resistors 447, 448, 449, 450 and through the contact parts 414, 401 to the grounded contact block B of the tracer assembly. Of course, when two of the contacts 414 are engaged by the respective contact pins 401, the same ground connection of the control grid in tube V11 will obtain except that the resistance of the grounded connection is reduced.

It will be remembered from the foregoing explanations that during normal operations and also when there is a possibility of the tracer running off the template, at least one of the tracer contacts is engaged by the contact block B. Consequently, under any of the just-mentioned conditions, the control grid in tube V11 is connected to ground through the block B of the tracer spindle. This lowers the grid potential of the tube V11 sufficiently to keep tube V11 firing. Hence, relay 4CR is normally energized, and its contact 4CR1 is closed as mentioned above.

Should the tracer approach a travelling position where the tracer block B may tend to become disengaged from all tracer contacts, thus signalling the danger that the tracer may stall, then the contact pressure at the tracer contact last contacted will gradually decline and a condition will be reached where the engagement between contact pin 401 and contact 414 is opened before the contact block B disengages itself from the contact pin 401. As soon as the circuit between pin 401 and contact 414 is broken, the ground connection in the grid circuit of tube V11 is eliminated. The grid potential in the tube immediately increases to the value determined by the connection with the secondary of transformer 422 so that the tube stops firing. Relay 4CR drops out and contact 4CR1 opens. This disconnects the tubes V1 and V2 from their plate-voltage supply. As a result, both tubes V1 and V2 also extinguish. The relays 1CR and 2CR drop out and cause the contacts 1CR2 and 2CR2 to energize contactor 2C, thus causing the motor M to run in the reverse direction. This resets the tracer spring bias in the direction required to obviate any stalling tendency.

It will be recognized that the just-mentioned corrective action overrides the control action of tubes V1, V2 and takes place before stalling of the tracer can actually occur. This is because the opening of the circuits extending through the contacts 414 in the tracer contact devices always precedes the opening of the circuits of the feed-control relays. By virtue of this anticipatory performance, the system secures a reliable tracing operation regardless of any intricacies in curvature of the contour being traced.

The system shown in Fig. 17 affords a reliable automatic tracing operation with the aid of greatly simplified control circuits. The simplification is achieved by subjecting the spring-bias pilot motor M to a continuously oscillating operation under control by a single contactor 3C which, in turn, is controlled by a single relay, here formed by a gaseous discharge tube V12, in response to four pressure-sensing devices associated with the four control contacts DC, UC, RC, LC of the tracer assembly.

Each of the four pressure-sensing devices is of the make-and-break type shown in Fig. 16 and described above. The contact pin 401 of each device (Fig. 17) is electrically connected with one of the respective feed-control relays DR, UR, RR, LR of the machine tool. When the contact block B in the tracer assembly engages a contact pin 401, the pin is grounded and the corresponding feed control relay is energized from source G to operate the machine feed. When, and as long as, the contact pressure is above an adjusted minimum value, the contact 414 (Figs. 16, 17) is also grounded to thereby control the operation of the relay tube V12 in the manner described below.

The tracer control system (Fig. 17) is energized from an alternating-current line through transformers 422 and 423. The pilot motor M of the tracer assembly is of the split-phase capacitor type described with reference to Figs. 10, 11 and is connected with transformer 423 through a reversing switch SW under control by a normally closed contact 3C1 and a normally open contact 3C2 of contactor 3C. Switch SW serves to set the system either for climb milling or for conventional milling. When, with a selected setting of switch SW, the contactor 3C is dropped off, its contact 3C1 energizes the motor to run in one direction; and when the contactor is picked up, its contact 3C2 energizes the motor to run in the other direction. The system operates to control the motor so that it will alternately run in opposite directions with such amounts of swing that the overall effect is to alter the median setting of the spring-bias direction in the tracer assembly as needed to always maintain the tracer point in contact with the template contour as the tracer point is travelling along the contour.

To secure this operation, the contacts 414 of the four pressure-sensing devices are connected by respective resistors 447, 448, 449, 450 with the control grid of tube V12 through a grid resistor 461. Grid bias voltage is supplied from transformer 442 through a rectifier 147a. The positive terminal of rectifier 147a is attached to the grounded cathode lead of tube V12. The negative rectifier terminal is connected through a resistor 462 to a grid-circuit point between resistor 461 and the parallel-related resistors 447 to 450.

Normally, during tracing operation, the contact block B touches at least one, and possibly two peripherally adjacent ones, of the four contact pins 401 so that at least one feed will be operating. Assume that under such condition the contact pressure exerted by block B upon one of the contact pins 401 suffices to close the contact 414, then the control grid of tube V12 is grounded through resistor 461 and through at least one of the resistors 447 to 450. Hence, tube V12 is firing, contactor 3C is energized, contact 3C2 is closed, and the pilot motor is energized to run in the direction (for instance, forward) determined by the setting of switch SW. Suppose now that the tracer operation approaches a stalling tendency so that the pressure between contact block B and all contact pins 401 becomes less than required to close any one of the pressure contacts 414. Then the control grid of tube V12 is no longer grounded, the negative grid bias from source 147a is fully effective, and the tube V12 is extinguished so that contactor 3C drops out and its contact 3C1 energizes the motor to run in the reverse direction. This changes the directional setting of the tracer bias spring to prevent stalling and to continue feed. When the motor has run reverse enough to increase the contact pressure in the tracer assembly up to the value needed for closing one of the pressure contacts 414, the tube again fires and the contactor picks up. This switches the motor M to run in the forward direction. The motor turns the bias spring forward until the pressure on all contacts becomes insufficient to hold any of the pressure contacts 414 closed. When that happens, the tube is quenched. This alternating operation continues during the entire travel of the tracer around the template contour.

The capacitor 452 and resistor 453, series-connected with each other across the coil of contactor 3C in Fig. 17, serve to prevent chattering of the contactor.

While the pressure-sensing devices used in the systems of Figs. 15, 17, and separately shown in Fig. 16, are of the make-and-break type, a pressure-responsive tracer-bias control according to our invention may also be secured with the aid of continuously variable pressure gauges. An embodiment of such a system will presently be described with reference to Figs. 18 and 19.

The tracer-bias control system shown in Fig. 18 is partly similar to that of Fig. 14. That is, the system comprises a pilot motor M with two field windings 306, 307 of which the fixed-phase winding 306 is energized through a phase-shift capacitor 308 directly from the secondary 305 of a transformer 301, while the variable-phase winding 307 is energized from an amplifier 310 under control by a sensing network energized from another secondary 302 of the transformer 301. The amplifier 310 may have the same design as the one described with reference to Fig. 14, and its effect upon the running direction and speed of the motor are also as described above, except that a reversing switch SW is interposed between the secondary 305 and the motor winding 306 to permit selecting the motor-running direction depending upon whether the system is to be set for climb milling or conventional milling.

As in the preceding embodiments, the tracer assembly (Fig. 18) has four quadrangularly arranged control contacts DC, UC, RC, LC connected with the respective feed control relays DR, UR, RR, LR in the same manner as described above (Figs. 2, 16). However, each of these four control contacts forms part of a pressure-sensing device that continuously varies an electric magnitude in dependence upon the contact pressure exerted by the contact block B of the assembly. An example of such a pressure-sensing device is separately shown in Fig. 19.

The device according to Fig. 19 is of the carbon-pile resistor type. It comprises a rigid capsule 465 of insulating material which is mounted on the housing portion 50 of the tracer sleeve and is closed by an insulating cap 466. Enclosed in the capsule is a pile of annular carbon disks 467 bordered by rigid pressure plates 468a, 468b of metal. Each tracer contact has a pin 469 that coaxially traverses the carbon pile but is completely insulated therefrom. An adjustable shoulder 470 of pin 469 bears against an insulating washer on the pressure plate 468a so that the carbon pile is compressed when the contact block B of the tracer spindle applies pressure upon the end of the contact pin 469. The resistance of the carbon pile decreases with the pressure thus applied.

Reverting to Fig. 18, it will be seen that the four resistance piles of the pressure-sensing devices are all series connected with each other by leads 471, 472, 473 and form together one of the four arms of a Wheatstone bridge network energized from the secondary 302 of transformer 301. The three other arms of the bridge network are formed by resistors 482, 483, 484. A potentiometer rheostat 486 across the output terminals 487, 488 permits adjusting the sensitivity of the control system. A potentiometer rheostat 485 across the input terminals of the bridge has a displaceable tap connected to the bridge output terminals 487 and serves to establish an arbitrary zero point. The output of the bridge is fed into the amplifier 310 which is supplied with power from the secondary 305.

Before putting the system into operation, it must be calibrated as follows: First the bridge network is balanced by adjusting the resistor 482 so that, with no pressure on any pressure-sensing device, the output voltage of the bridge is substantially zero and the motor torque is negligible. Then a small pressure, for instance of three ounces, is exerted on one of the pressure-sensing devices. This will cause the motor to rotate. Next the potentiometer rheostat 485 is adjusted for zero rotation.

When the system is thus set to a selected zero condition, a small increase in pressure causes the motor to rotate in one direction, and a decrease in pressure causes the motor to rotate in the opposite direction. The bridge network totalizes the pressure effects on all four sensing devices, and the control operates to hold this totalized pressure within adjustable limits. Since full bias-spring pressure would obtain in case the tracer runs off, the maximum limit must be somewhat below the full bias-spring pressure. The minimum limit is a somewhat lower value greater than zero. When the pressure exceeds the maximum limit, the pilot motor rotates forward. This forces the tracer more strongly against the template and reduces the pressure on the pressure-sensing devices. When the pressure on the sensing devices drops below the minimum limit, the pilot motor rotates backward. This increases the pressure on one or more sensing devices and prevents the control from stalling. Since, by keeping the total pressure on the sensing devices between these two limits, the tracer is prevented from leaving the template and is also prevented from stalling, it automatically proceeds around the template regardless of the template shape.

The same result is accomplished when using other pressure-responsive transducer units than carbon capsules, and these units may be located at other places. For instance, strain gauges or other transducers may be located at the universal pivot bearing or on the tracer support or on the tracer spindle, as long as these transducers respond by an electric variation to changes in pressure between the tracer and the template.

While we have described our invention with reference to electrically controlled tool-feed drives, it will be obvious that the invention is also applicable to machine tools with hydraulically controlled tool-feed drives. It will further be understood by those skilled in the art, upon a study of this disclosure, that our invention can be embodied in various apparatus and systems other than those specifically mentioned, without departing from the essence of the invention and within the scope of the claims annexed hereto.

We claim:

1. A tracer apparatus for controlling the tool feed of a profiling machine tool in accordance with the contour of a template being traced, comprising a tracer support having four coordinately arranged feed control contacts, a tracer member deflectable relative to said support and having a contact part engageable with any two sequential ones of said contacts at a time to close them depending upon the deflecting direction of said tracer member said tracer member having a single tracer point engageable with the template contour, a spring assembly rotatable on said support and having spring means connected with said tracer member for biasing said tracer point toward the contour to be traced, a motor connected with said spring assembly for rotating said assembly to thereby change the spring bias direction, and condition-responsive electric control means operatively connected with said tracer member and responsive to a tracer operating condition at said tracer point, and electric circuit means connected between said control means and said motor for controlling said motor to vary said spring bias direction for maintaining the progressing tracer member in engagement with the contour.

2. A tracer apparatus for controlling the feed of a machine tool in accordance with a template contour being traced, comprising a tracer support, a tracer structure universally deflectable relative to said support and having a single point in engagement with said template contour when in operation, four electric feed-control contacts mounted on said support at quadrangularly related points and operable by deflection of said tracer structure from a normal position, a spring assembly mounted on said support and having spring means connected with said tracer structure for biasing said tracer point toward the contour, said spring assembly being rotatable for changing the bias direction of said spring means, a pilot motor connected with said spring assembly for imparting rotation thereto, condition-responsive electric control means connected with said motor for controlling said motor to vary said bias direction for maintaining said tracer structure in progression along the contour, said control means having a part comprised by said tracer structure and being responsive to a tracer operating condition dependent upon the relation of said bias direction to the contour at said contour-engaging point of said tracer structure.

3. A tracer device for controlling a machine tool in accordance with the contour of a template, comprising a tracer support, a spindle structure universally pivoted to said support to be deflectable relative thereto and having a point engageable with the template contour, selectively operable feed control means for displacing the tracer support together with the tool of the machine relative to the template, said feed control means being coordinately arranged on said tracer support and selectively operable by said spindle structure depending upon the deflecting direction of said structure, a spring assembly mounted on said tracer support and having spring means connected with said spindle structure for biasing said point toward the contour, said spring assembly being rotatable on said tracer support about the axis of said spindle structure for varying the direction of the biasing force of said spring means, a reversible pilot motor connected with said spring assembly for rotating said assembly, condition-responsive electric control means comprised by said spindle structure and responsive to a variable condition of tracer operation dependent upon said biasing-force direction relative to the template contour at said point, and motor control means connected with said pilot motor and including said condition-responsive control means to be controlled thereby, whereby said motor is controlled to run in the direction required for the spring force to maintain said tracer point in progression along the contour.

4. A tracer apparatus for controlling the tool feed of a profiling machine tool in accordance with a contour being traced, comprising a tracer support having four coordinately arranged control contacts, a tracer member deflectable relative to said support and having a part engageable with any two sequential ones of said contacts to operate them depending upon the deflecting direction of said tracer member, a spring assembly rotatable on said support and having spring means connected with said tracer member for biasing said member toward the contour to be traced, a motor connected with said spring assembly for rotating said assembly to thereby change the spring bias direction, electric control means comprising respective relaying means operatively coupled with said sequential contacts to operate in dependence upon the control condition of said contacts, said control means being connected with said motor for controlling said motor to rotate said spring assembly so as to maintain said tracer member biased against the contour during tracer progression.

5. An apparatus according to claim 4, said relaying means comprising four control circuits extending through said respective control contacts to be selectively energized by said contacts simultaneously with the feed-control operation of said respective contacts, whereby said control means operate to control said motor in dependence upon the tool feed of the machine.

6. A tracer apparatus for controlling the tool feed of a profiling machine tool in accordance with a contour being traced, comprising a tracer support having four coordinately arranged feed control contacts, a tracer member deflatable relative to said support and having a part engagable with any two sequential ones of said contacts to operate them depending upon the deflection direction of said tracer member, a spring assembly rotatable on said support and having spring means connected with said tracer member for biasing said member toward the contour to be traced, a motor connected with said spring assembly for rotating said assembly to thereby change the spring bias direction, electric control means comprising pressure-responsive devices connected with said respective feed-control contacts to provide control intelligence depending upon the contact pressure imposed upon said individual contacts by said part of said tracer member, said control means being connected with said motor for controlling said motor by said intelligence to vary said spring bias direction thereby maintaining said spring bias directed toward the contour.

7. A tracer appartus for controlling the tool feed of a profiling machine tool in accordance with a contour being traced, comprising a tracer support having four coordinately arranged feed control contacts, a tracer member deflectable relative to said support and having a part engageable with any two sequential ones of said contacts to operate them depending upon the deflecting direction of said tracer member, a spring assembly rotatable on said support and having spring means connected with said tracer member for biasing said member toward the contour to be traced, a motor connected with said spring assembly for rotating said assembly to thereby change the spring bias direction, control means connected with said motor, sensing means having an electric property variable in dependence upon directional change of said spring bias relative to the contour point engaged by said part of said tracer member, said sensing means forming part of said control means for normally controlling said motor to counteract such directional change, and compensating means responsive to a given irregularity in tracer operating condition and connected with said control means for superimposing a corrective compensation upon the control of said motor.

8. A tracer apparatus for controlling the tool feed of a profiling machine tool in accordance with the contour of a template being traced, comprising a tracer support having four coordinately arranged feed control contacts, a tracer member deflectably mounted on said support to close them depending upon the deflecting direction of said tracer member, a spring assembly rotatable on said support and having spring means connected with said tracer member for biasing said member toward the contour to be traced, a motor connected with said spring assembly for rotating said assembly to thereby change the spring bias direction, two controllable electric valve devices having respective control circuits and having reactive time delay means in said control circuits, circuit means connecting said valve control circuits with said two sequential feed control contacts that are in operative condition at a time, whereby said valve devices change their conductance when the closing intervals of said respective feed control contacts exceed a given duration determined by said time delay means, and a motor control system connected with said motor for controlling said motor to vary said spring bias direction in response to change in conductance of said valve devices, said two valve devices being connected in said control system so that the running direction of said motor depends upon whether or not said two valve devices are both conductive at a time.

9. Apparatus according to claim 8, comprising a circuit connection by-passing said time delay means for obviating the time delay when said circuit connection is closed, relay means connected with said respective feed control contacts to be energized when said respective feed control contacts are closed by said part of said tracer member, said relay means having normally closed relay contacts series connected with each other in said by-passing circuit connection for closing said connection only when all said relay means are simultaneously deenergized.

10. A tracer apparatus for controlling the tool-and-tracer feed of a machine tool in accordance with the contour of a template, comprising a tracer support, a tracer member universally deflectable relative to said support and having a part engageable with the contour, said tracer support having two pairs of mutually opposite feed control devices arranged about said member in coordinate relation to each other for vertical and horizontal feed control respectively, the two devices of each pair being selectively controllable by said tracer member depending upon the deflecting direction of said member, a structure mounted on said support and rotatable about said member, biasing spring means connected between said support and said member for biasing said part of said member toward the contour, a motor connected with said structure for rotating it to change the bias direction of said spring means, two pairs of relays connected with said respective feed control devices and operative together therewith, two timing devices connected with said respective pairs of relays and having respective output circuits in active condition only when the operating intervals of the relays of said respective pairs exceed a given timing period whereby either of said two output circuits or both are active at a time depending upon which one or two of said feed control devices are operating steadily, and a motor control system connected with said motor and comprising said two output circuits for controlling said motor to shift said bias in one and the other direction when said two output circuits are simultaneously active and inactive respectively.

11. A tracer apparatus for controlling the tool feed of a profiling machine tool in accordance with the contour of a template being traced, comprising a tracer support having four coordinately arranged control contacts, a tracer member deflectably mounted on said support, said tracer having a point engageable with the contour and having a part engageable with any two sequential ones of said contacts to operate them depending upon the deflecting direction of said tracer member, a spring assembly rotatable on said support and having spring means connected with said tracer member for biasing said member toward the contour to be traced, a motor connected with said spring assembly for rotating said assembly to thereby change the spring bias direction, four relays having respective coil circuits individually controlled by said four control contacts and having four relay contacts respectively, two timing-relay means each having a control circuit comprising two of said relay contacts to which two mutually opposite ones of said control contacts are related, said two relay contacts being parallel connected with each other for individually controlling said timing-relay means to respond only when said two control contacts both close a minimum interval of time determined by the timing period of said timing relay means, current supply means connected with said motor to provide energization therefor and connected with said two timing-relay means and controlled thereby to run said motor when both said timing-relay means have responded.

12. A tracer apparatus for controlling the tool feed of a profiling machine tool in accordance with the contour of a template being traced, comprising a tracer support having four coordinately arranged feed-control devices each having a control contact, a tracer member deflectably mounted on said support and having a point engageable with the contour and a part engageable with any two sequential ones of said devices to operate said two devices and close said control contacts of said two devices depending upon the deflecting direction of said tracer member, a spring assembly rotatable on said support and having spring means connected with said tracer member for biasing said member toward the contour to be traced, a motor connected with said spring assembly for rotating said assembly to thereby change the spring bias direction, four relays connected with said four control contacts respectively to be energized under control by said respective feed-control devices, a control circuit connected with said motor and comprising two circuit branches for running said motor in one and the other direction depending upon which of said circuit branches is closed at a time, one of said branches comprising contact means connected with said relays and closing said one branch when said four relays are simultaneously deenergized whereby said motor is controlled to run in the direction required to obviate tracer stalling, time-delay means, said other circuit branch comprising contact means connected with said relays through said time-delay means and closing said other branch when both control contacts of said two sequentially adjacent feed-control devices are simultaneously closed a given minimum interval of time determined by said time-delay means whereby said motor is controlled to run in the other direction to obviate tracer run-off.

13. A tracer apparatus for controlling the tool feed of a profiling machine tool in accordance with the contour of a template being traced, comprising a tracer assembly having a support and having feed control means mounted on said support, said tracer assembly having a tracer member engageable with the template contour and deflectable relative to said support, a spring assembly rotatable on said support and having spring means connected with said tracer member for biasing said member toward the contour, said member being engageable with said feed control means for operating said feed control means depending upon deflection of said member, a motor connected with said spring assembly for rotating said assembly to thereby change the spring bias direction, a control system connected with said motor and comprising pressure-sensing means mounted on said tracer assembly and having an electric operating condition responsive to the pressure between said tracer member and the template for controlling said motor to vary said spring bias direction so as to maintain said member in engagement with the contour.

14. A tracer apparatus for controlling the tool feed of a profiling machine tool in accordance with the contour of a template being traced, comprising a tracer support having four coordinately arranged feed-control devices, a tracer member deflectably mounted on said support and having a point engageable with the contour and a part engageable with any two sequential ones of said control devices to operate them depending upon the deflecting direction of said tracer member, a spring assembly rotatable on said support and having spring means connected with said tracer member for biasing said point toward the contour, a motor connected with said spring assembly for rotating said assembly to thereby change the spring bias direction, a control system connected with said motor and comprising four pressure-responsive devices having respective make-and-break contacts connected with said four feed control devices to operate in dependence upon pressure exerted by said part upon said feed control devices, whereby said pressure-responsive devices control said motor to vary said spring-bias direction for maintaining said point in engagement with the contour.

15. A tracer apparatus for controlling the tool-and-tracer feed of a machine tool in accordance with the contour of a template, comprising a tracer support, a tracer member universally deflectable relative to said support and having a part engageable with the contour, said tracer support having two pairs of mutually opposite feed control devices arranged about said member in coordinate relation to each other for vertical and horizontal feed respectively, the two devices of each pair being selectively controllable by said tracer member depending upon the deflecting direction of said member, a structure mounted on said support and rotatable about said member, biasing spring means connected between said support and said member for biasing said part of said member toward the contour, a reversible motor drivingly connected with said structure for rotating it to change the bias direction of said spring means, two pairs of relays connected with said respective feed control devices and operative together therewith so that any two relays of said respective two pairs may operate simultaneously, and a motor control system connected with said motor and comprising said pairs of relays for directionally controlling said motor to run forward and reverse respectively when said two simultaneously operable relays are both active and both inactive respectively.

16. A tracer apparatus for controlling the tool and feed of a machine tool in accordance with the contour of a template, comprising a tracer support having four quadrangularly arranged contact devices, each of said devices having a first contact and a second contact, a tracer member engageable with the template and deflectable relative to said support, said tracer member having a part engageable with any two sequential ones of said first contacts to operate one or both of said first contacts in dependence upon the deflecting direction of said member, said second contacts being joined with said respective first contacts to close later and open earlier than said respective first contacts so that the opening of said second contacts occurs during decreasing contact pressure between said part and said respective first contacts, four feed-control circuits comprising respective relays and extending through said part and through said respective first contacts, a spring assembly rotatable on said support and having spring means connected with said tracer member for biasing said member toward the contour to be traced, a reversible motor connected with said spring assembly for rotating said assembly to thereby change the spring bias direction, motor control means connected with said motor, timing means connecting said control means with said four relays for controlling said motor to run in one direction when two of said four relays are simultaneously active for a given minimum period of time determined by said timing means, a circuit connecting said motor control means with said four second contacts and comprising said second contacts in parallel relation to one another for controlling said motor to run in the other direction when all four of said second contacts are simultaneously open.

17. A tracer apparatus for controlling the tool feed of a machine tool in accordance with the contour of a template, comprising a tracer support having four quadrangularly arranged feed-control devices, a tracer member engageable with the template and deflectable relative to said support, said tracer member being engageable with the contour and having a part engageable with said feed-control devices for operating at most two adjacent ones of said devices at any one time depending upon the deflecting direction of said tracer member, a spring assembly rotatable on said support and having spring means connected with said tracer member for biasing said member toward the contour, a motor connected with said spring assembly for rotating said assembly to thereby change the spring bias direction, electric sensing means responsive to contact pressure between said part and said respective feed-control devices, and motor control means connected with said motor and comprising said sensing means for controlling said motor in dependence upon said contact pressure.

18. A tracer apparatus according to claim 1 in which said condition responsive electrical control means comprises sensing means located near said tracer point, said sensing means, when in operation, forming a gap with the template, said sensing means having an electric magnitude variable in response to the gap condition and being joined with said spring assembly to rotate together therewith, said electric circuit means operatively connecting with said sensing means for controlling said motor in dependence upon said electric magnitude to thereby maintain said spring bias directed toward the contour.

19. A tracer apparatus according to claim 2, said control means comprising sensing means located near said point of said tracer member and forming, when in operation, a gap with the template, said sensing means providing intelligence variable in response to variations of said gap and forming part of said control means for normally controlling said motor by said intelligence to counteract such directional change, and compensating means responsive to a given irregularity in tracer operating condition and connected with said control means for superimposing a corrective compensation upon the control of said motor.

20. A tracer apparatus according to claim 2, said control means comprising sensing means located near said point of said tracer structure and forming, when in operation, a gap with the template, said sensing means providing intelligence variable in response to variations of said gap for normally controlling said motor by said intelligence to counteract such directional changes, and compensating means, having four relay circuits connected with said respective feed control contacts, to respond to given feed conditions, said compensating means being connected with said control means for super-imposing a corrective compensation upon the control of said motor when said feed conditions tend to cause tracing faults.

21. A tracer apparatus according to claim 2, said control means comprising two pickups located near said single point and forming when in operation two respective gaps together with said template at places leading and trailing respectively the location of template engagement, a balanceable electric network having two branches comprising said respective pickups to provide an output voltage directionally indicative of network unbalance in response to mutually inverse variations of said two gaps, said two pickups being joined with said spring assembly to rotate together therewith, said control means connecting said network with said motor for directionally controlling said motor in dependence upon said network output voltage, whereby said spring assembly is controlled to maintain said tracer member in engagement with the contour during the tracing progression of said member.

22. A tracer apparatus according to claim 2 comprising a balanceable alternating current network having two impedance branches, two pickups located near said point and forming, when in operation, two respective gaps together with said template at places leading and trailing respectively the location of template engagement, said pickups having respective variable-inductance coils forming part of said branches so that said network provides an output voltage directionally indicative of network unbalance in response to mutually inverse variations of said two gaps, said two pickups being joined with said spring assembly to rotate together therewith, said control means connecting said network with said motor for directionally controlling said motor in dependence upon said network output voltage, whereby said spring assembly is controlled to maintain said tracer structure in engagement with the contour during the tracing progression of said member.

23. A tracer apparatus according to claim 2 comprising a balanceable alternating current network having two impedance branches, two pickups located near said point and forming, when in operation, two respective gaps together with said template at places leading and trailing respectively the location of template engagement, said pickups having respective variable-inductance coils forming part of said branches so that said network provides an output voltage directionally indicative of network unbalance in response to mutually inverse variations of said two gaps, said two pickups being joined with said spring assembly to rotate together therewith, compensating devices having relay means operable under control by said tracer contacts to respond to given feed conditions involving a tendency of faulty tracing operation, and electric circuit means for unbalancing said network, said control means connecting said network with said motor for directionally controlling said motor in dependence upon said network output voltage, said relay means connecting said circuit means with said network branches when responding to said conditions, whereby said network is unbalanced, to cause rotation of said spring assembly so as to oppose said tendency.

24. A tracer apparatus according to claim 2, said control means comprising sensing means responsive to a tracer operating condition dependent upon directional change of said spring bias relative to the contour point engaged by said part of said tracer, said control means normally controlling said motor in accordance with the response of said sensing means to counteract said directional change, compensating circuit means for super-imposing, when connected with said control means, a corrective control upon said motor, relay circuits connected with said respective feed control contacts to be energized when said contacts are closed by said part of said tracer member, said relay circuits having time delay means connecting said compensating means to said control means only when said respective feed control contacts are closed a given minimum interval of time, whereby said compensating means are effective only when the tracer operating conditions tend to become faulty.

25. A tracer assembly according to claim 2 including two compensating impedance means for superimposing a corrective control on said motor in a sense depending upon which of said impedance means is connected with said control means at the time, two relay devices selectively connecting said respective impedance means with said control means, a distributor switch having a movable structure mechanically joined with said spring assembly to rotate together with said spring assembly, said two relay devices being connected through said distributor to the two sequentially adjacent feed-control contacts that are in operative condition at a time, said relay devices having respective time delay means connecting said impedance means with said control system when said respective feed control contacts are closed a given minimum interval of time.

26. A tracer apparatus according to claim 2 comprising two compensating control devices each comprising a normally non-conductive electronic tube having a control grid and having a capacitive timing circuit connected with said grid, circuit means connecting said two timing crcuits with two sequential feed control contacts respectively, whereby said tubes become conductive only when the individual closing intervals of said respective two feed control contacts exceed a duration set by said respective timing circuits, said tubes having respective plate circuits, and connecting means connecting said plate circuits with said control means for superimposing thereon a corrective compensation causing said motor to run in a direction depending upon whether or not both of said two tubes are conductive at a time.

27. A tracer apparatus according to claim 1 including relay means comprising four coil circuits controlled by said four respective control contacts to be individually energized when said control contacts are closed by said part of said tracer member, said relay means having normally closed relay contacts respectively, said electric circuit means comprising said four relay contacts series connected with each other, said electric circuit means being closed for energizing said motor to run in a given direction when all said relay contacts are closed simultaneously.

28. With a contour-tracer controlled machine tool according to claim 2 in which the feed means has feed-control relays controlled by the tracer to impart feed motion to the tool means and tracer, relative to the work, under control by the tracer, the combination of an automatic tracer control device comprising a member joined by said spring means with said tracer, and rotatable relative to said tracer for varying the direction of said spring force, contact means connected with said respective feed-control relays to operate together therewith, said control means comprising said contact means and being connected with said motor for controlling said motor in dependence upon given operating conditions of said feed means, whereby said force direction is varied by said motor to maintain said tracer in progression along the contour.

29. A tracer apparatus according to claim 1 wherein the control means comprises four pressure-responsive devices mounted on said tracer support and connected with said respective four control contacts, said devices having conductances respectively dependent upon the contact pressure between said control contacts and said part of said tracer member, whereby said four pressure-responsive devices control said motor in dependence upon said conductance to maintain said spring bias directed toward the contour.

30. A tracer apparatus according to claim 2, said control means comprising electric transducer means of variable resistance forming part of said tracer structure and responsive to said pressure between said tracer structure and the template for controlling said motor to vary said spring bias direction.

31. A tracer apparatus according to claim 1 in which said condition responsive electric control means comprises an electric sensing means responsive to contact pressure between said part and said respective feed-control contacts, each of said sensing means consisting essentially of a resistor device having a variable electric resistance responsive to mechanical strain, whereby said electric control means controls said motor in accordance with said contact pressure.

32. A tracer device according to claim 3, said condition responsive means comprising pressure sensing means mounted on said support and having an electric operating condition responsive to changes in the pressure between said point and said template contour, current supply means connected with said motor, motor reversing means, said motor control means connected with said reversing means, and comprising said pressure sensing means for causing said reversing means to energize said motor to run alternately in different directions depending upon the sense of departure of said pressure from a given norm range, whereby the bias direction of said spring means is caused to oscillate about a positional range adapted to hold the travelling spindle structure against the contour.

33. A tracer device according to claim 32 in which said reversing means comprises a contactor having a normally open contact, and a normally closed contact for energizing said reversible motor to run in one or the other direction depending upon whether said contactor is energized or deenergized, said motor control means having a relay connected between said pressure sensing means and said contactor for energizing said contactor when said pressure goes beyond a given limit value.

34. A tracer device according to claim 32 in which said feed control means comprises four quadrangularly arranged units, and said pressure sensing means comprises four make-and-break contacts arranged in series in the energizing circuit of said motor, said contacts being closed only when the pressure between said structure and said respective units exceeds a given value, said four make-and-break contacts respectively being connected to said units electrically in parallel relation, so that closing of any one of said four make-and-break contacts causes said motor to run in one direction, and opening of all four make-and-break contacts causes said motor to run in the other direction.

35. A tracer device according to claim 32 in which said pressure sensing means comprises variable-resistance gages, said motor control means comprising a balanceable network, said gages forming part of said network for controlling its balance condition, whereby the output voltage of said network varies in a sense depending upon the direction in which said pressure departs from a given norm range, said net-work being connected with said reversing means for controlling said output voltage.

36. A tracer device according to claim 32 in which said pressure sensing means comprises a plurality of variable-resistance gages arranged in angularly related positions relative to the axis of rotation of said structure, and said motor control means comprises a bridge network having a bridge arm in which said plurality of gages are all series connected with each other for cumulatively varying the balance condition of said network in response to said pressure, said network being connected with said reversing means for controlling said reversing means in dependence upon said balance condition.

37. A tracer device according to claim 32, said feed control means comprising four quadrangularly arranged units, and said pressure sensing means comprises four variable-resistance gages mounted in said respective units and responsive to pressure between said tracer member and said respective units, said control means comprising a bridge network having an arm in which said four gages are all series connected with each other for cumulatively varying the balance condition of said network in response to said pressure, said network being connected with said reversing means for controlling said reversing means in dependence upon said balance condition.

38. A tracer apparatus according to claim 2 comprising spring setting means interposed between said spring means and said assembly and selectively displaceable between two given positions relative to said assembly for angularly shifting the biasing direction of said spring means relative to said tracer structure, said biasing direction being in lagging relation to the contour-engaging point of said tracer structure for one tracing direction along the contour when said spring setting means is set to one of said positions, and said biasing direction being also in lagging relation to said point for the opposite tracing direction when said spring setting means is set to the other position.

39. A tracer apparatus according to claim 2 in which said spring assembly comprises a slider mounted therein, said spring means being connected between said slider and said tracer structure for biasing said structure toward engagement with said contour, said slider being displaceable relative to said assembly between two given positions for angularly shifting the biasing direction of said spring means relative to said tracer structure, whereby said tracer apparatus is set for operation in one and the other tracing direction, respectively, along the contour, depending upon the selected position of said spring means.

40. A tracer apparatus according to claim 1 in which said spring means comprises three springs each having one end connected with said tracer member and the other end connected with said spring assembly, said three springs being angularly spaced from each other about said tracer member, one of said springs being permanently stressed to impose a component biasing force upon said member and selector means interposed between said spring assembly and said other ends of said respective two other springs for selectively stressing one of said other springs to impose another component biasing force upon said tracer member, whereby said latter member is subjected to a resultant spring force of a direction depending upon which of said other two springs is stressed.

41. Tracer apparatus according to claim 1 in which said spring means comprises a group of three springs two of which are aligned with each other on diametrically opposite sides of said tracer member while the third spring extends substantially at right angles to the alignment direction so that said group is substantially T-shaped, each of said three springs having one end connected with said tracer member, said third spring having its other end connected with said spring assembly in permanently stressed condition so as to impose on said tracer member a first component biasing force, a part displaceably mounted on said assembly and having two points of connection with the respective other ends of said two springs for selectively stressing one of said two springs depending upon the position of said part relative to said spring assembly, whereby one of said two springs imposes another component biasing force upon said tracer member in leading or lagging relation to said first component biasing force, depending upon which of said two springs is stressed at a time.

42. Tracer apparatus according to claim 1 in which said spring means comprises a group of three springs two of which are aligned with each other on opposite sides of said tracer member while the third spring extends substantially at right angles to the alignment direction so that said group is substantially T-shaped, each of said three springs having one end connected with said tracer member, a slide piece mounted on said spring assembly and selectively displaceable between two positions relative to said spring assembly in a direction parallel to said alignment direction, said slide piece having two spring retainer parts spaced from each other in said alignment direction and located on opposite sides of said tracer member, said two aligned springs having their respective other ends attached to said respective parts so that only one of said two springs is under tension at a time depending upon the position of said slide piece relative to said assembly, said slide piece having a third spring retainer part spaced 90° from each of said two parts, and said third spring having its other end attached to said third part so as to be permanently tensioned, whereby said group of springs imposes upon said tracer member a biasing force whose direction depends upon the selected position of said slide piece.

43. Tracer apparatus according to claim 42 comprising a cylindrical member substantially coaxial with said tracer member and rigidly joined with said assembly to rotate together therewith, a ring surrounding said cylindrical member and being axially displaceable thereon, a mechanism connecting said ring with said slide piece for displacing said slide piece in accordance with axial displacement of said ring, and a control lever stationarily pivoted relative to said tracer support and slidably engageable with said ring for axially displacing said ring.

44. Tracer apparatus according to claim 3 in which said spindle is tubular, a hollow cylindrical tracer part coaxially mounted on said spindle and engageable with the template contour, said motor control means comprising an electric pickup device located within the hollow of said cylindrical part to cooperate with the template for controlling said motor, said pickup device being rotatable relative to said part about the axis of said spindle, and mechanical connecting means extending through said spindle and rigidly joining said pickup device with said assembly, whereby said pickup device is rotated together with said assembly when said motor is in operation.

45. Tracer apparatus according to claim 3 in which said spindle is tubular, said tracer structure comprising a hollow cylindrical tracer part of non-magnetic material coaxially mounted on said spindle for engaging the template contour at said point, said motor control means comprising an electric pickup device located within said part and having two magnetic reluctance pickups each having a magnetic pole piece and a coil on said pole piece, said two pole pieces having respective pole faces forming when in operation two respective gaps with the template, said pole faces being located in leading and trailing relation to the contour point engaged by said part during its tracing progression, said pickup device being rotatable relative to said part about the axis of said spindle, and mechanical connecting means extending through said spindle and joining said pickup device with said assembly, whereby said pickup device is rotated together with said spring assembly to vary the lengths of said respective gaps in inverse relation to each other when said motor is in operation.

46. Tracer apparatus according to claim 3 in which said motor control means comprising electric pickup means mechanically joined with said spring assembly to rotate together therewith, said pickup means forming when in operation a gap with the template for controlling said motor in response to gap variations, slip rings firmly joined with said spindle to rotate together with said pickup means, said slip rings being electrically connected with said pickup means, and brush contacts slidably engaging said respective slip rings and mounted stationarily relative to said support.

47. Tracer apparatus according to claim 44, said mechanical connecting means comprising a tubular rod extending longitudinally through said tubular spindle, insulated slip rings joined with said spring assembly to rotate together with said assembly and said pickup device, stationary terminals having brush contacts slidingly engaging said respective slip rings, and electric leads extending through the interior of said tubular rod and connecting said pickup means with said slip rings.

48. Tracer apparatus according to claim 3 in which said spindle is tubular, and a hollow cylindrical tracer part coaxially mounted on said spindle for engaging the template contour, a connecting rod firmly joined with said spring assembly and freely passing through said spindle, a pair of electric plug-and-socket couplings of which a first one is mounted on said rod near said hollow tracer part, said motor control means comprising an electric pickup device to cooperate with the template for controlling said motor, said pickup device being located within said hollow part and joined with the second one of said couplings so as to be removably connectable with said first coupling to rotate together with said assembly.

49. Tracer apparatus according to claim 1 comprising a bias setting member interposed between said spring means and said assembly and being displaceable between two positions relative to said assembly for setting the spring bias direction relative to the motor-driven rotation so as to secure a lagging angle of said bias direction relative to the engagement of said tracer point with said contour, and said control means comprising electric pickup means mechanically joined with said assembly to rotate together therewith, said pickup means being disposed near said tracer point and forming when in operation a gap with the template for controlling said motor in response to variations of said gap.

50. Tracer apparatus according to claim 2 comprising a distributor switch having two pairs of stationary contact segments, the two segments of each pair being insulated from each other and extending substantially over respective one-halfs of a full circle about the axis of rotation of said assembly, said two pairs of segments being angularly displaced from each other and said segments being electrically connected with said four respective control contacts, said distributor switch having two movable contact arms selectively engageable with said segments and mechanically connected with said assembly to rotate together therewith, whereby any two peripherally adjacent ones of said four control contacts, depending upon the deflecting direction of said tracer structure, are electrically connected with said two contact arms for controlling said motor.

References Cited in the file of this patent

UNITED STATES PATENTS

| | | |
|---|---|---|
| 1,840,853 | Shaw et al. | Jan. 12, 1932 |
| 2,679,620 | Berry | May 25, 1954 |
| 2,704,012 | Trinkle | Mar. 15, 1955 |
| 2,752,827 | Ernst | July 3, 1956 |

FOREIGN PATENTS

| | | |
|---|---|---|
| 505,470 | Great Britain | May 11, 1939 |